United States Patent [19]
Osumi

[11] Patent Number: 6,030,311
[45] Date of Patent: Feb. 29, 2000

[54] CONTROL SYSTEM FOR A CONTINUOUSLY VARIABLE TRANSMISSION

[75] Inventor: Toshihiko Osumi, Hiroshima, Japan

[73] Assignee: Mazda Motor Corporation, Japan

[21] Appl. No.: 09/139,664

[22] Filed: Aug. 25, 1998

[30]  Foreign Application Priority Data

Aug. 25, 1997 [JP] Japan .................................. 9-244665

[51] Int. Cl.$^7$ .................................................. F16H 61/00
[52] U.S. Cl. .................................. 476/42; 476/10; 476/9; 476/18
[58] Field of Search .................................. 476/40, 42, 9, 476/10, 15, 18; 475/72, 73, 74, 76

[56]  References Cited

U.S. PATENT DOCUMENTS

| | | | |
|---|---|---|---|
| 5,090,951 | 2/1992 | Greenwood | 475/216 |
| 5,207,736 | 5/1993 | Fredriksen . | |
| 5,902,207 | 5/1999 | Sugihara | 476/10 |

FOREIGN PATENT DOCUMENTS

| | | |
|---|---|---|
| 0 507 329 | 10/1992 | European Pat. Off. . |
| 0 728 965 | 8/1996 | European Pat. Off. . |
| 0 733 830 | 9/1996 | European Pat. Off. . |
| 196 31 294 | 2/1997 | Germany . |
| 3-223555 | 10/1991 | Japan . |
| 6-101754 | 4/1994 | Japan . |

OTHER PUBLICATIONS

European Search Report.
Vahabzadeh and Linzell, Modeling, Simulation, and Control Implementation for a Split–Torque, Geared Neutral, Infinitely Variable Transmission, Power Systems Research Department, General Motors Research Laboratories, Warren, Michigan, SAE 1991, Transaction Journal of Passenger Cars, vol. 100, No. 6, XP–002081681, pp. 546–557.

*Primary Examiner*—Tamara L. Graysay
*Assistant Examiner*—David Fenstermacher
*Attorney, Agent, or Firm*—Sixbey, Friedman, Leedom & Ferguson, PC; Donald R. Studebaker

[57]  ABSTRACT

A control system for a toroidal type continuously variable transmission which incorporates a toroidal continuously variable gear mechanism comprising an input and an output toroidal disk and a roller disposed between the input and output toroidal disks and continuously varies a gear ratio according to inclinations of the roller actuates a stepping motor, when a specific driving condition which causes the continuously variable transmission to switch between a first and a second control mode and directional reversal of torque transmission through the toroidal continuously variable gear mechanism occurs with a result of causing a shift of the roller from one side to another side of the neutral position, to operate a double-slider shift valve to cause the shift of the roller in advance.

29 Claims, 21 Drawing Sheets

CONTROL SYSTEM FOR A CONTINUOUSLY VARIABLE TRANSMISSION

BACKGROUND OF THE INVENTION

1. Field of the Invention

The invention relates to a control system for a continuously variable transmission installed to a vehicle, and more particularly, to a control system for a continuously variable transmission of a type having a toroidal continuously variable mechanism.

2. Description of the Related Art

There have been known various continuously variable transmissions such as incorporating a toroidal continuously variable mechanism installed to an automobile vehicle. Such a toroidal type continuously variable transmission, which comprises an input and output toroidal disk and a roller disposed between the input and output toroidal disks, continuously varies a gear ratio according to inclinations of the roller relative to the toroidal disks. The roller is supported for rotation by a support member which is called a trunnion. In order to incline the roller the trunnion is shifted in a direction tangent to the toroidal surface of the toroidal disk by a hydraulically operated actuator. A shift of the trunnion, and hence an inclination of the roller, is controlled by hydraulic working pressure supplied to the hydraulically operated actuator through a shift valve of a double-slider type which has a hollow valve sleeve axially slidable in a valve body and a valve spool axially slidable in the valve sleeve.

The valve sleeve is shifted and changed in position relative to the valve spool by a stepping motor to regulate hydraulic working pressure supplied to the actuator so as to shift the roller through the trunnion in a direction tangent to the toroidal surface from a neutral position. As a result of the shift, the roller inclines relative to the toroidal disk to change a gear ratio between an input speed to the toroidal continuously variable mechanism and output speed from the toroidal continuously variable mechanism. The inclination of the roller is mechanically fed back to the shift valve to shift the valve spool in the same direction in which the valve sleeve has been shifted, as a result of which the shift valve returns to a balanced or neutral position. During the return of the shift valve to the neutral position, while the roller is left inclined, it is shift back to the neutral position and held in the neutral position.

As described in, for example, Japanese Unexamined Patent Publications Nos. 3-223555 and 6-101754, it has been known that what is called a geared neutral starting system is employed in the continuously variable transmission. In the toroidal type continuously variable transmission equipped with the geared neutral starting system, the toroidal continuously variable mechanism is mounted on a transmission input shaft connected to the engine, and a planetary gear mechanism is mounted on a secondary shaft in parallel to the input shaft. The planetary gear mechanism is comprised of three rotary elements, namely a sun gear, an internal gear and a pinion carrier supporting a pinion carrier meshed with the sun gear and the internal gear. One of these rotary elements, i.e. the internal gear is used as an transmission output gear. Rotation of an engine is imparted to the planetary gear mechanism partly directly through the pinion carrier and partly through the sun gear via the toroidal continuously variable mechanism.

The ratio of rotation between the pinion carrier and the sun gear is varied by controlling the gear ratio of the toroidal continuously variable mechanism so as to hold the transmission output element, i e. the sin gear, remain stand still, providing a neutral condition. By increasingly or decreasingly varying the gear ratio of the toroidal continuously variable mechanism causes the internal gear as the transmission output element to rotate in a forward direction or in a reverse direction.

Further, some toroidal type continuously variable transmissions equipped with the geared neutral starting system are switchable between what is called a high gear ratio control mode in which output rotation of the toroidal continuously variable mechanism is transmitted directly to the secondary shaft without the aid of the planetary gear mechanism and what is called a low gear ratio control mode in which rotation of an engine is transmitted directly to the pinion carrier and transmitted to the sun gear through the toroidal continuously variable mechanism. In such a toroidal type continuously variable transmission, in order to cause a switch between the high and low modes, the toroidal type continuously variable transmission is provided with a low mode clutch to connect and disconnect the input shaft and the pinion carrier of the planetary gear mechanism on the secondary shaft and a high mode clutch to connect and disconnect the toroidal continuously variable mechanism on the input shaft and the secondary shaft. These mode clutches are alternately locked and unlocked in a state where a gear ratio of the continuously variable transmission remains identical in both high and low modes.

As was previously described, after a shift in a direction tangent to the toroidal surface of the toroidal disks and inclination, the roller of the toroidal continuously variable mechanism is returned to its neutral position, i.e. a position of a plane perpendicular to the tangential direction when the plane passes a center axis of rotation of the toroidal disks, and is balanced in that position. However, the roller is practically balanced in a position slightly shifted on a specific side of the neutral position in the tangential direction.

Specifically, as shown in FIG. 24, when torque is transmitted, for example, from an input toroidal disk A to an output toroidal disk B through a roller D supported by a trunnion C (this direction of torque transfer is referred to as a normal direction) while the input and output toroidal disks A and B and the roller D are rotating in directions indicated by arrows A', B' and C', respectively, drag force from the input or drive toroidal disk A or reaction force of the output or driven toroidal disk B acts on the trunnion C as traction force T directed downward as viewed in the figure. Hydraulic working pressure is supplied to a roller actuator E to hold the trunnion C or the roller D in the neutral position against the traction force T. In this instance, the roller D is practically balanced in a position shifted according to input torque in a direction opposite to the traction force T (upward as viewed in the figure), i.e. in a direction in which the toroidal continuously variable mechanism changes its gear ratio toward the higher speed side (which is referred to as a plus side), from the neutral position. The shift direction depends upon the transfer direction of torque through the toroidal continuously variable mechanism. For example, when torque is transmitted in a direction to the input toroidal disk A from the output toroidal disk B (which is referred to as a reverse direction) while the input and output toroidal disks A and B and the roller D are rotating in directions indicated by arrows A', B' and C', respectively, the roller D is balanced in a position shifted downward as viewed in the figure, i.e. in a position shifted in a direction in which the toroidal continuously variable mechanism changes its gear ratio toward the lower speed side (which is referred to as a minus direction), from the neutral position. Accordingly, the roller D shifts instantaneously from one side to another side of the neutral position. The directional reversal of torque transfer occurs in response to a switch from a normal drive state in which the vehicle is driven by the engine to a reverse drive state in which the engine is driven by the vehicle running with inertia or vice versa.

In the toroidal type continuously variable transmissions switchable between the high and low gear ratio control modes, torque is transmitted from the output toroidal disk to the input toroidal disk in the low mode while the vehicle is in the normal drive state and from the input toroidal disk to the output toroidal disk in the high mode while the vehicle is in the normal drive state, and, on the other hand, from the input toroidal disk to the output toroidal disk in the low mode while the vehicle is in the reverse drive state and from the output toroidal disk to the input toroidal disk in the high mode while the vehicle is in the reverse drive state. The directional reversal of torque transfer occurs also in response to a switch between the low and high gear ratio control modes. An instantaneous shift, and hence an instantaneous inclination, of the roller is accompanied by an occurrence of shocks.

SUMMARY OF THE INVENTION

It is an objective of the invention to provide a control system for a toroidal type of continuously variable transmission in which a switch of drive state of the vehicle and a switch of control mode of the transmission are achieved without being accompanied by shocks.

The foregoing object of the present invention is achieved by providing a control system for a toroidal type continuously variable transmission which incorporates a toroidal continuously variable gear mechanism which comprises an input toroidal disk, an output toroidal disk, a roller disposed between the toroidal input and output disks and a support member such as a trunnion for supporting the roller for rotation, and further incorporates a hydraulically operated roller actuator for shifting and inclining the roller relative to the input and output toroidal disks from a neutral position through the support member according to hydraulic pressure to continuously vary a gear ratio between an input speed to the input toroidal disk from a driving power source, such as a vehicle engine, and an output speed to a driven element, such as drive wheels of the vehicle, from the output toroidal disk and a shift valve for controlling hydraulic pressure supplied to the roller actuator according to vehicle running conditions to adjust an inclination of the roller and stopping supply of the hydraulic pressure to the roller actuator by means of a mechanical feedback of the inclination of the roller thereto to return the roller back to the neutral position. The continuously variable transmission control system controls the shift valve to control the hydraulic pressure such that, when a predetermined driving condition of the driving power source, such as a predetermined engine speed, which causes directional reversal of torque transmission through the toroidal continuously variable gear mechanism with a result of a shift of the roller from one side to another side of the neutral position, the roller actuator causes the shift of the roller in advance. The shift valve may be of a double-slider type which comprises a valve body, a hollow valve sleeve received to slide axially in the valve body and a valve spool received to slide axially in the hollow valve sleeve. The hollow valve sleeve and the valve spool are relatively shifted to control and supply hydraulic pressure to the roller actuator to shift and incline the roller according to a shifted relative position of them and the valve spool is shifted by means of a mechanical feedback of the shift and inclination of the roller thereto to stop supply of the hydraulic pressure to the roller actuator.

The toroidal type of continuously variable transmission may further incorporate a planetary gear mechanism which comprises three rotary elements, namely a pinion carrier connected to an input member through which driving power is transmitted to the toroidal continuously variable gear mechanism from the driving power source, a sun gear connected to the output toroidal disk and an internal gear connected to the driven element. The continuously variable transmission control system switches the continuously variable transmission between a first gear ratio control mode in which driving power is transmitted through a first power transmission path including both toroidal continuously variable gear mechanism and planetary gear mechanism and a second gear ratio control mode in which driving power is transmitted through a second power transmission path including the toroidal continuously variable gear mechanism but omitting the planetary gear mechanism according to driving conditions and controls the shift valve to control hydraulic pressure such that, when the predetermined driving condition with which directional reversal of torque transmission through the toroidal continuously variable gear mechanism is caused with a result of a shift of the roller from one side to another side of the neutral position is detected, the roller actuator causes the shift of the roller in advance.

The continuously variable transmission control system may force the shift valve to control hydraulic pressure so as to cause a shift of the roller in a direction in which the toroidal continuously variable gear mechanism causes a change in gear ratio toward a higher speed side (a lower gear ratio side) when there occurs directional reversal of torque transmission through the toroidal continuously variable gear mechanism due to a switch of the continuously variable transmission from the first gear ratio control mode to the second gear ratio control mode while the vehicle is in a normal drive state in which the engine drives the vehicle or when there occurs directional reversal of torque transmission through the toroidal continuously variable gear mechanism due to a switch of the continuously variable transmission from the second gear ratio control mode to the first gear ratio control mode while the vehicle is in a reverse drive state in which the engine is driven by inertial running of the vehicle, and to control hydraulic pressure so as to cause a shift of the roller in a direction in which the toroidal continuously variable gear mechanism causes a change in gear ratio toward a lower speed side (higher gear ratio side) when there occurs directional reversal of torque transmission through the toroidal continuously variable gear mechanism due to a switch of the continuously variable transmission from the second gear ratio control mode to the first gear ratio control mode while the vehicle is in the normal drive state or when there occurs directional reversal of torque transmission through the toroidal continuously variable gear mechanism due to a switch of the continuously variable transmission from the first gear ratio control mode to the second gear ratio control mode while the vehicle is in the reverse drive state. The hydraulic pressure the shift valve provides is determined based on input torque to the toroidal continuously variable gear mechanism at a point of time that the directional reversal of torque transmission occurs. Specifically, the hydraulic pressure is determined to become greater as the input torque to the toroidal continuously variable gear mechanism rises.

The continuously variable transmission control system may further force the shift valve to control hydraulic pressure so as to cause a shift of the roller in a direction in which the toroidal continuously variable gear mechanism causes a change in gear ratio toward a higher speed side when there occurs a switch from the normal drive state to the reverse drive mode while the continuously variable transmission is in the first control mode or when there occurs a switch from the reverse drive state to the normal drive state while the continuously variable transmission is in the second control mode, and controls the shift valve to control hydraulic pressure so as to cause a shift of the roller in a direction in which the toroidal continuously variable gear mechanism causes a change in gear ratio toward a lower speed side when there occurs a switch from the reverse drive state to the normal drive mode while the continuously variable transmission is in the first control mode or when there occurs a switch from the normal drive state to the reverse drive state while the continuously variable transmission is in the second control mode.

Switching of the continuously variable transmission between the first and second gear ratio control modes may be performed by means of first and second friction coupling means such as clutches. Specifically, the first friction coupling means or clutch is locked to bring the continuously variable transmission into the first gear ratio control mode by incorporating both toroidal continuously variable gear mechanism and planetary gear mechanism in the first power transmission path, and the second friction coupling means or clutch is locked to bring the continuously variable transmission into the second gear ratio control mode by incorporating the toroidal continuously variable gear mechanism only in the second power transmission path. The continuously variable transmission control system causes the first and second friction coupling means or clutches to switch the continuously variable transmission between the first and second control modes according to the driving conditions and controls the shift valve to control the hydraulic pressure such that, when a predetermined driving condition with which a switch of the continuously variable transmission between the first and second gear ratio control modes occurs is caused and directional reversal of torque transmission through the toroidal continuously variable gear mechanism occurs with a result of a shift of the roller from one side to another side of the neutral position occurs is detected, the roller actuator causes the shift of the roller in advance while the first and second friction coupling means or clutches remain locked.

According to the continuously variable transmission control system of the invention, when directional reversal of torque transmission through the toroidal continuously variable gear mechanism occurs with a result of a shift of the roller from one side to another side of the neutral position, the shift valve is controlled to provide hydraulic pressure to force the roller actuator to cause the shift of the roller in advance. As a result, the roller is prevented from being abruptly shifted and inclined, so that the continuously variable transmission prevents an occurrence of shift shock. The same is true for the continuously variable transmission which is switchable between two gear ratio control modes and between two drive states, namely the normal drive state and the revere drive state. either or both.

An advance shift distance of the roller is determined based on input torque to the continuously variable transmission at the point of time the directional reversal of torque transmission occurs, which cause a precise shift of the roller timely with an effect of preventing shift shock more effectively. When continuously variable transmission is switched between the high and low gear ratio control modes by alternately locking and unlocking two friction coupling means, namely two clutches, a shift of the roller on directional reversal of torque transmission through the toroidal continuously variable gear mechanism is caused while both friction coupling means remain locked, so that the continuously variable transmission holds a gear ratio unchanged during the shift of the roller. This is advantageous to prevent shift shock.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
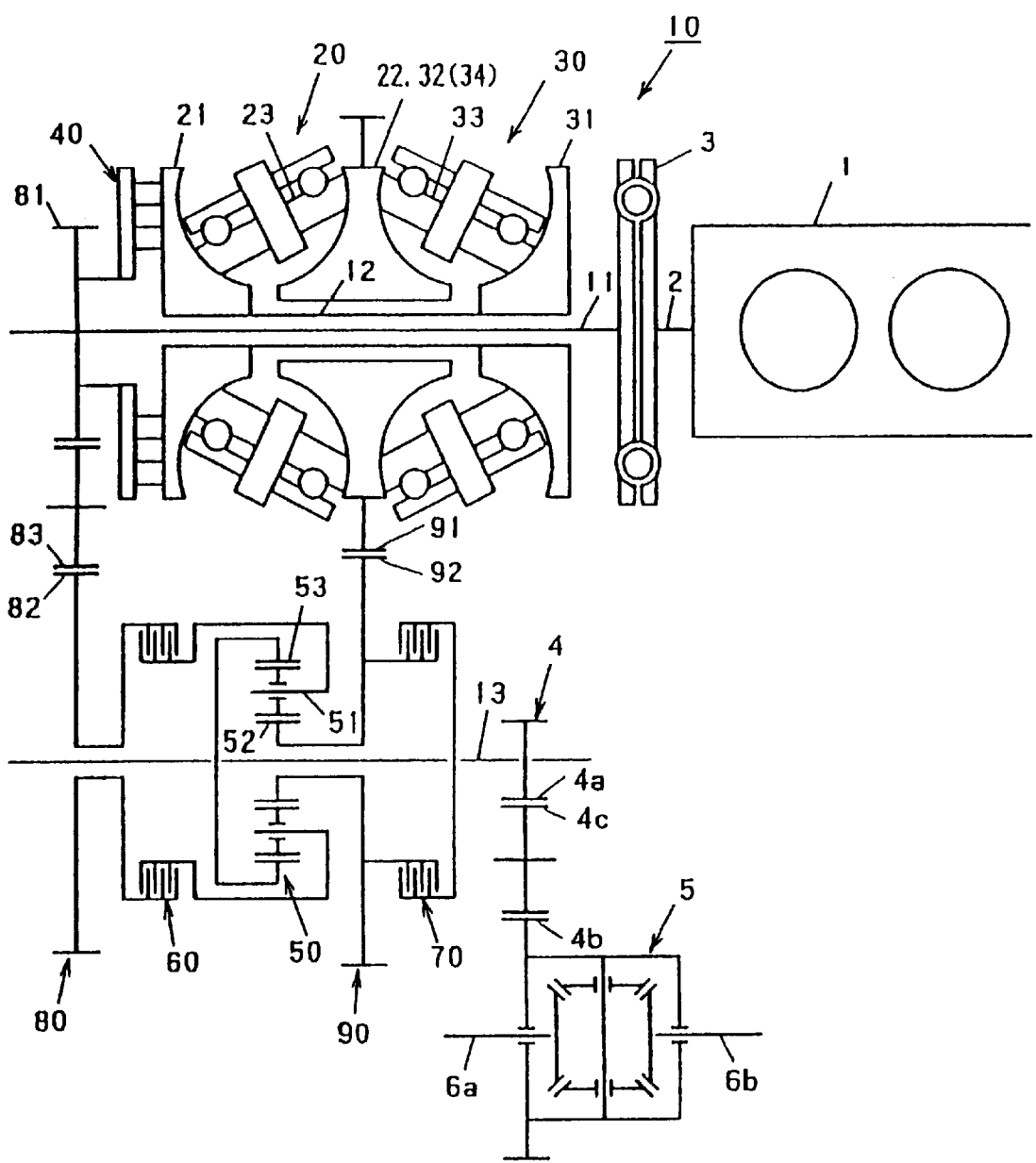
FIG. 1 is a skeleton view of a toroidal type continuously variable transmission controlled by a control system in accordance with an embodiment of the invention.

Referring to the drawings in detail and, in particular, to FIG. 1 showing a toroidal type continuously variable transmission (CVT) 10 with a control system in accordance with an embodiment of the invention, the continuously variable transmission 10 has three shafts, namely an input shaft 11 connected to an output shaft 2 of an engine 1 through a tortional damper 3, a hollow primary shaft 12 in which the output shaft 11 is coaxially disposed and a secondary shaft 13 disposed in parallel to the primary shaft 12. These transmission shafts 11–13 extend transversely in the vehicle body. The primary shaft 12 mounts thereon a toroidal type first or rear and second or front continuously variable gear mechanisms 20 and 30 in order from a side remote from the engine 1 and a loading cam 40. The secondary shaft 13 mounts thereon a planetary gear mechanism 50 and two clutches, namely a low mode clutch 60 and a high mode clutch 70. There are low and high mode gear trains 80 and 90 between input shaft 11 and the secondary shaft 13. The toroidal type first and second toroidal continuously variable gear mechanisms 20 and 30 have the same mechanism. Each toroidal continuously variable gear mechanism 20, 30 comprises an input disk 21, 31, an output disk 22, 32 and a pair of first and second roller 23, 33 between the input and output surfaces to transmit driving power from one to another. The input disks 21 and 31 are mounted on the primary shaft 12 by means of spline-engagement. The output disks 22 and 32 are formed integrally as one whole, which is hereafter referred to as an integrated output disk 34.

First toroidal continuously variable gear mechanism 20 is placed to direct the face of the input disk 21 toward the engine 1, and, however, the second toroidal continuously variable gear mechanism 30 is placed to direct the face of the output disk 32 toward the engine 1. The input disks 21 and 31 of the first and second toroidal continuously variable gear mechanisms 20 and 30 are fixedly mounted to opposite ends of the primary shaft 12, respectively, and the output disks 22 and 32 of the first and second toroidal continuously variable gear mechanisms 20 and 30 are mounted for rotation on the primary shaft 12.

The input shaft 11 is provided with a low mode first gear 81 forming a part of the low mode gear train 80 secured to one end thereof remote from the engine 1 and the loading cam 40 between the low mode first gear 81 and the first toroidal continuously variable gear mechanism 20. The integrated output disk 34 is provided with an peripheral first high mode gear 91 forming a part of the high mode gear train 90. The secondary shaft 13 mounts thereon for rotation a low mode second gear 82 forming a part of the low mode gear train 80 and a high mode second gear 92 for forming a part of the high mode gear train 90. These first and second low mode gears 81 and 82 of the low mode gear train 80 are connected through a high mode idle gear 83, and similarly, these high mode first and second gears 91 and 92 of the high mode gear train 90 are connected through a high mode idle gear 93. The secondary shaft 13 mounts thereon the planetary gear mechanism 50 having a sun gear 52 meshed with the high mode second gear 92 and an internal gear 53 secured to the secondary shaft 13. The high mode clutch 70 is placed adjacent to the high mode second gear 92 to connect the high mode second gear 92 to the secondary shaft 13 and disconnect the high mode second gear 92 from the secondary shaft 13. The secondary shaft 13 at one of its end is connected to a differential 5 by means of an output gear train 4 comprising first and second gears 4a and 4b. Driving power is transmitted to right and left wheel drive axles 6a and 6b through the differential 5.

As was previously described, because the toroidal continuously variable gear mechanisms 20 and 30 have the same mechanism, the following description is directed to the toroidal continuously variable gear mechanism 20 only.

Figure 2:
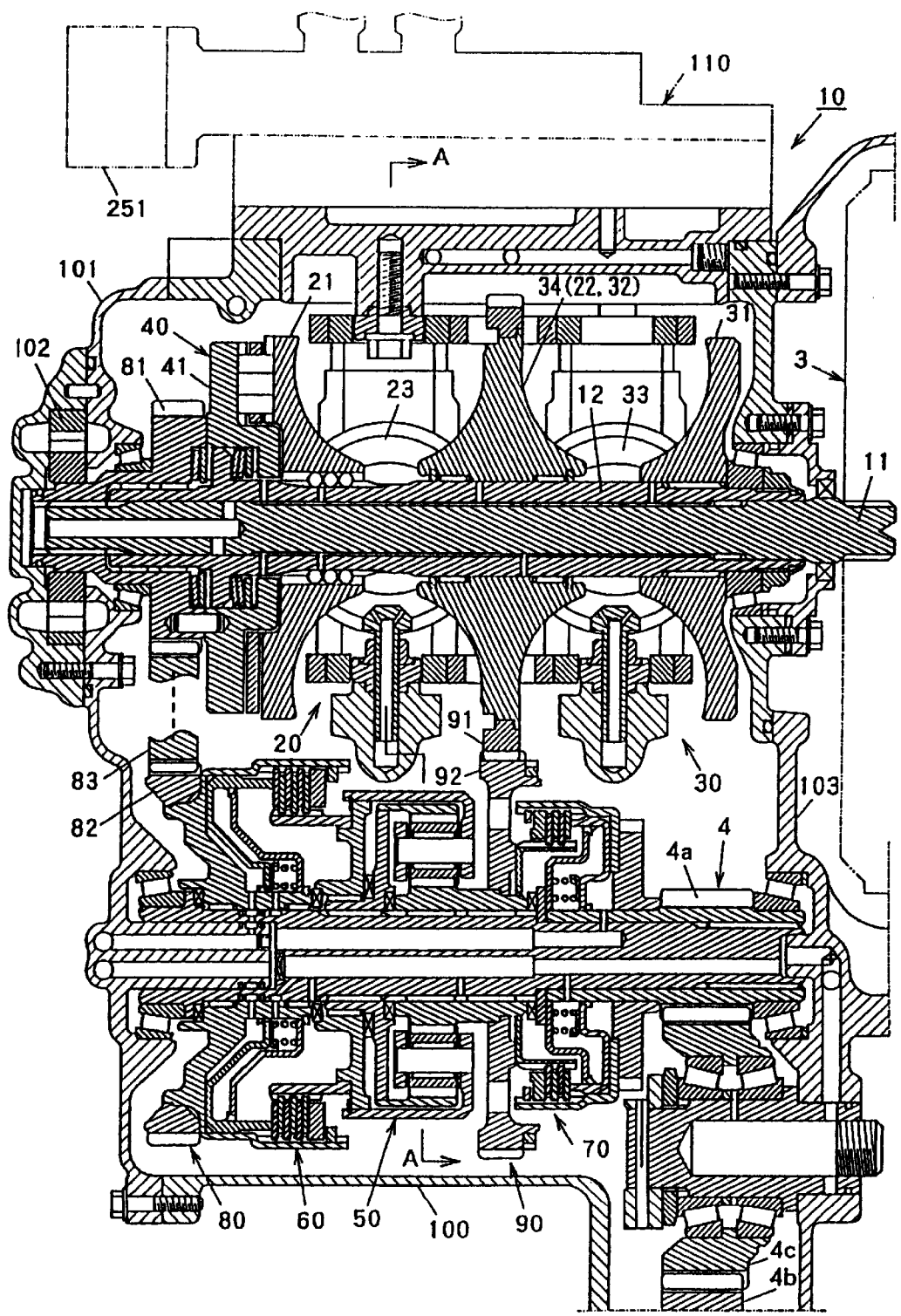
FIG. 2 is an expanded cross-sectional view of an essential part of the toroidal type continuously variable transmission.
Figure 3:
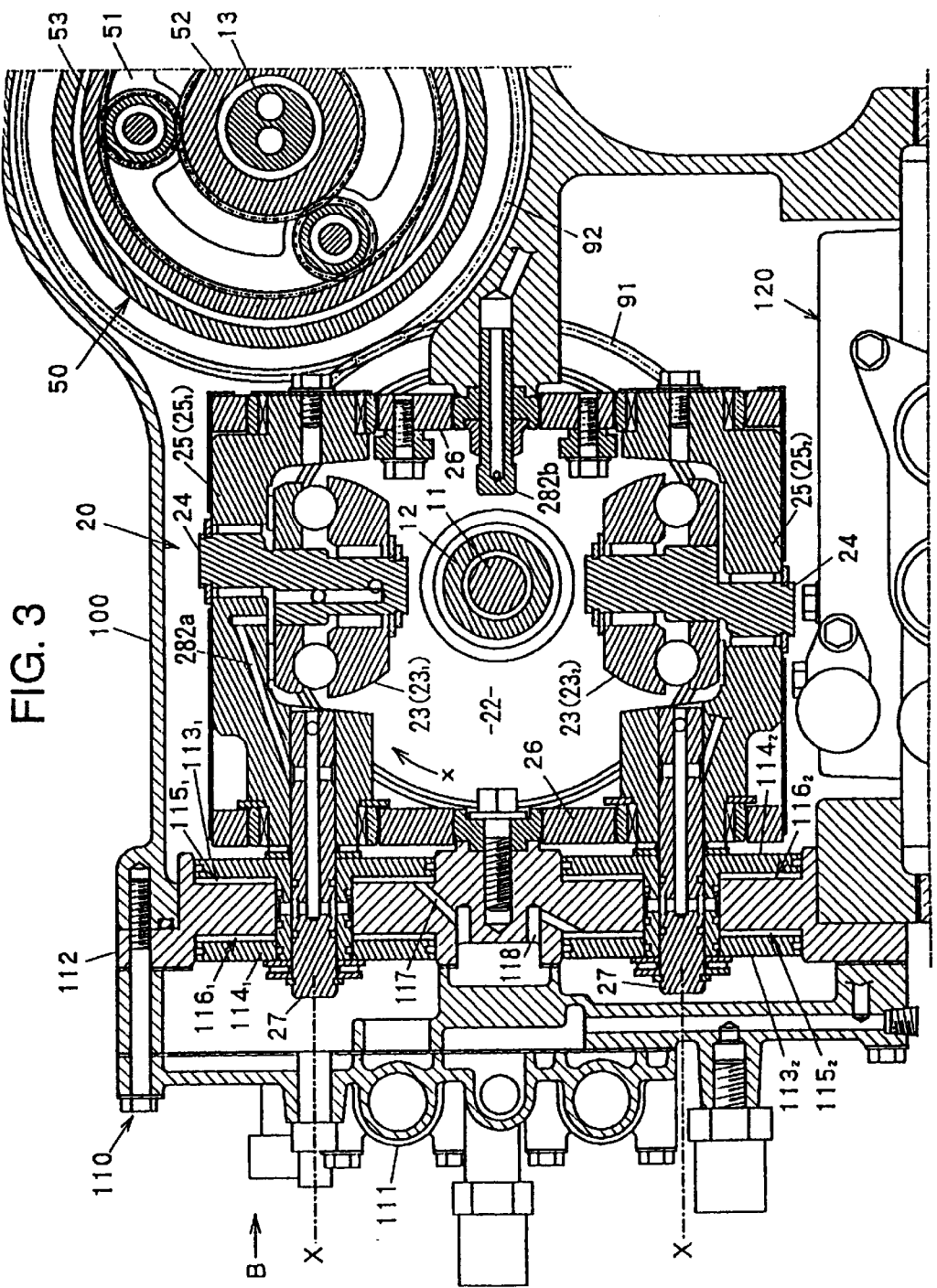
FIG. 3 is a cross-sectional view of FIG. 2 taken along line A—A.

Referring to FIGS. 2 and 3 in detail, each roller 22, 23 is supported by a trunnion 25 through a shaft 24 radially extending. The roller 22, 23 at its both ends is in contact with the opposite toroidal surfaces of the input and output disks 21 and 22. The first and second rollers 22 and 23 are placed in the same plane passing the center axis of rotation of the input shaft 12 and on opposite sides of the center axis of rotation of the input shaft 12. The trunnion 25 is held at axially opposite sides by supports 26 so as to rotate about a horizontal axis X tangential to the toroidal surface and perpendicular to the shafts 24 and to move back and forth along the axis X. The trunnion 25 is provided with a trunnion rod 27 extending in a direction of the axis X. The roller 23 is rolled by means of a speed change control unit 110 secured to the transmission housing 100 through the trunnion 25 and trunnion rod 27.

The speed change control unit 110 includes a hydraulic control section 111 and a trunnion drive section 112. The trunnion drive section 112 includes a piston $113_1$ and a piston $114_1$ both of which are attached to the rod 27 for the first roller $23_1$ and a piston $113_2$ and a piston $114_2$ both of which are attached to the rod 27 for the s second roller $23_2$. Hydraulic pressure chambers $115_1$ and $116_1$ are formed facing to the first piston $113_1$ and the first piston $114_1$, respectively, and similarly, hydraulic pressure chambers $115_2$ and $116_2$ are formed facing to the second piston $113_2$ and the second piston $114_2$, respectively. The hydraulic pressure chamber $115_1$ for the first piston $113_1$ is placed close to the first roller $23_1$ and the hydraulic pressure chamber $116_1$ for the first piston $113_1$ is placed far from the first roller $23_1$. On the other hand, the hydraulic pressure chamber $116_2$ for the second piston $113_2$ is placed close to the second roller $23_2$ and the hydraulic pressure chamber $115_2$ for the second piston $113_2$ is placed far from the first roller $23_1$. Hydraulic pressure provided by the hydraulic control section 111 is delivered into the hydraulic pressure chambers $115_1$ and $115_2$ through oil paths 117 and 118, respectively, for and into the hydraulic pressure chambers $115_1$ and $116_2$ through oil paths (not shown).

In hydraulic pressure delivery control for the toroidal continuously variable gear mechanism 20 by way of example, when the hydraulic pressure PH in the first and second hydraulic pressure chambers $115_1$ and $115_2$ becomes higher than a neutral level and relatively to the hydraulic pressure PL in the first and second reduction hydraulic pressure chambers $116_1$ and $116_2$, the first trunnion $25_1$ is forced to move horizontally toward the right as viewed in FIG. 3 and the second trunnion $25_2$ is forced toward the left.

If the output disk 22 is rotating in a clockwise direction as viewed in FIG. 3, the first roller $23_1$ receives downward force from the output disk 22 and upward force from the input disk 21 rotating in a counterclockwise direction during moving toward the right, and conversely the second roller $23_2$ receives upward force from the output disk 22 and downward force from the input disk 21 during moving toward the left. As a result, both rollers $23_1$ and $23_2$ incline so as to shift their contact points with toroidal surfaces of the input disk 21 radially outward and their contact points with toroidal surfaces of the output disk 22 radially inward, thereby lowering a gear ratio of the toroidal continuously variable gear mechanism 20. On the other hand, when the hydraulic pressure PL in the first and second reduction hydraulic pressure chambers $116_1$ and $116_2$ becomes higher than a neutral level and relatively to the hydraulic pressure PH in the first and second speed increase pressure chambers $115_1$ and $115_2$, the first trunnion $25_1$ is forced to move horizontally toward the left as viewed in FIG. 3 and the second trunnion $25_2$ is forced toward the right. At this time, when the output disk 22 rotates in the direction X, the first roller $23_1$ receives upward force from the output disk 22 and downward force from the input disk 21 during moving toward the left, and the second roller $23_2$ receives downward force from the output disk 22 and upward force from the input disk 21 during moving toward the left. As a result, both rollers $23_1$ and $23_2$ incline so as to shift their contact points with toroidal surfaces of the input disk 21 radially inward and their contact points with toroidal surfaces of the output disk 22 radially outward, thereby changing the toroidal continuously variable gear mechanism 20 to a higher gear ratio. Controlling of the hydraulic pressure PH or PL will be described in detail later with reference to a hydraulic control circuit 200 shown in FIG. 8.

Operation of the toroidal continuously variable gear mechanism 30 occurs in the same way as described above regarding the toroidal continuously variable gear mechanism 20.

Because the splined input disks 21 and 22 are placed on opposite splined ends of the primary shaft 12, respectively, and the output disks 22 and 32 are integrated, the first and second toroidal continuously variable gear mechanisms 20 and 30 always have same input speed and output speed, and provide always the same gear ratio.

Figure 4:
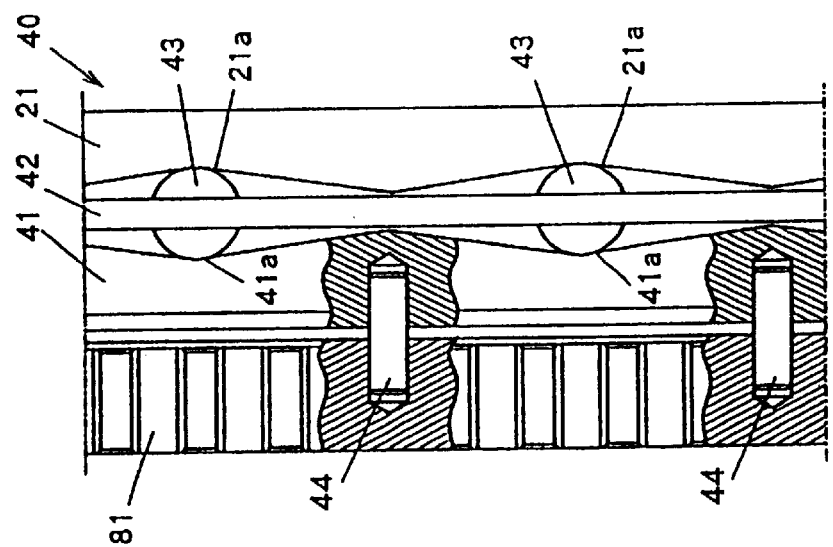
FIG. 4 is an explanatory view showing the correlation between the first gear, a loading cam and an input disk.
Figure 5:
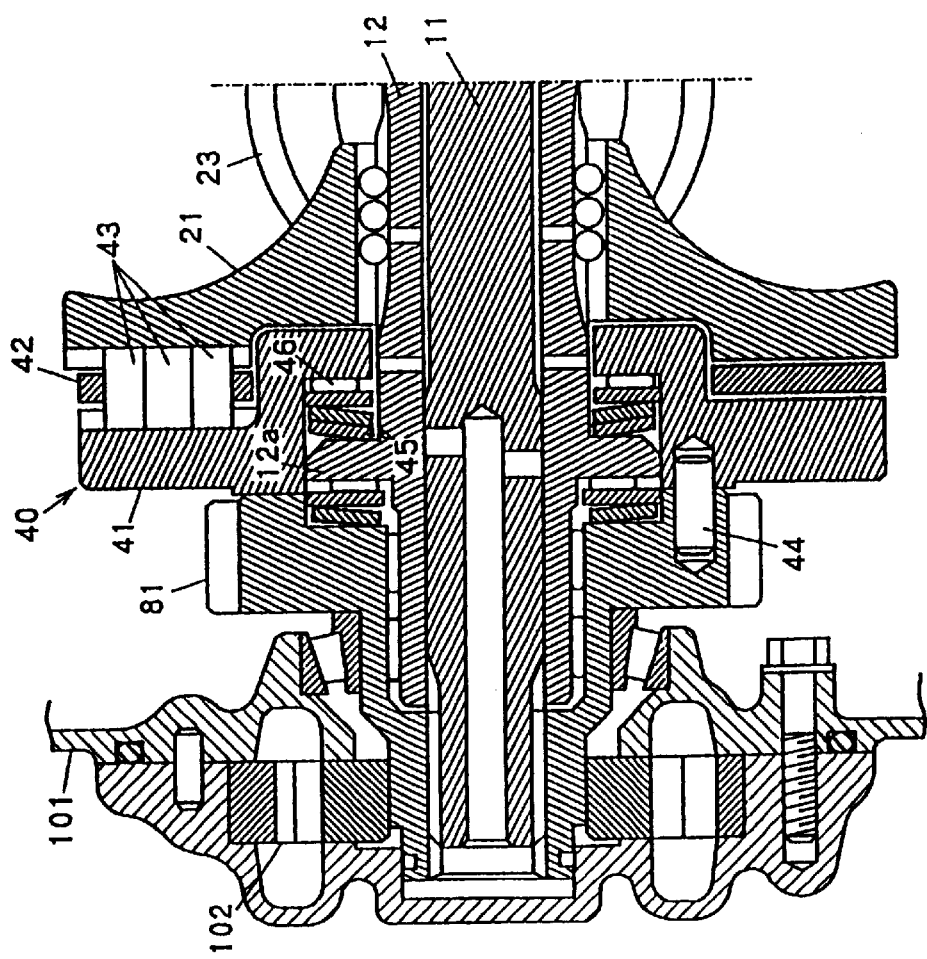
FIG. 5 is an enlarged cross-sectional view of an input shaft and parts mounted on the input shaft.

FIG. 4 shows the loading cam 40 in detail. The loading cam 40 has a cam disk 41 disposed between the low mode first gear 81 of the low mode gear train 80 and the input disk 21 of the first toroidal continuously variable gear mechanism 20. The cam disk 41 has a face cam with alternate arrangement of crests and roots 21a formed thereon. The input disk 21 at its back has a face cam formed thereon correspondingly to the face cam of the cam disk 41. A plurality of rollers 43 held by a retainer disk 42 are interposed between the face cams. The cam disk 41 is mechanically coupled to the low mode first gear 81 by means of a plurality of coupling pins 44. As shown in FIG. 5, there are arranged conical disk springs 45, a needle bearing 46 and a bearing race 47 between the cam disk 41 and primary shaft flange 12a. The cam disk 41 is forced against the input disk 21 by the conical disk springs 45. By means of the structure, the rollers 43 are interposed between the roots 21a and 41a of the face cams to transmit drive torque input to the cam disk 41 through the input shaft 11 via the low mode first gear 81 to the input disk 21 of the first toroidal continuously variable gear mechanism 20 and further to the input disk 31 of the second toroidal continuously variable gear mechanism 30 through the primary shaft 12.

As shown in FIG. 5, the transmission rear end cover 101 is provided with an oil pump 102 which is driven by means of the low mode first gear 81.

Figure 6:
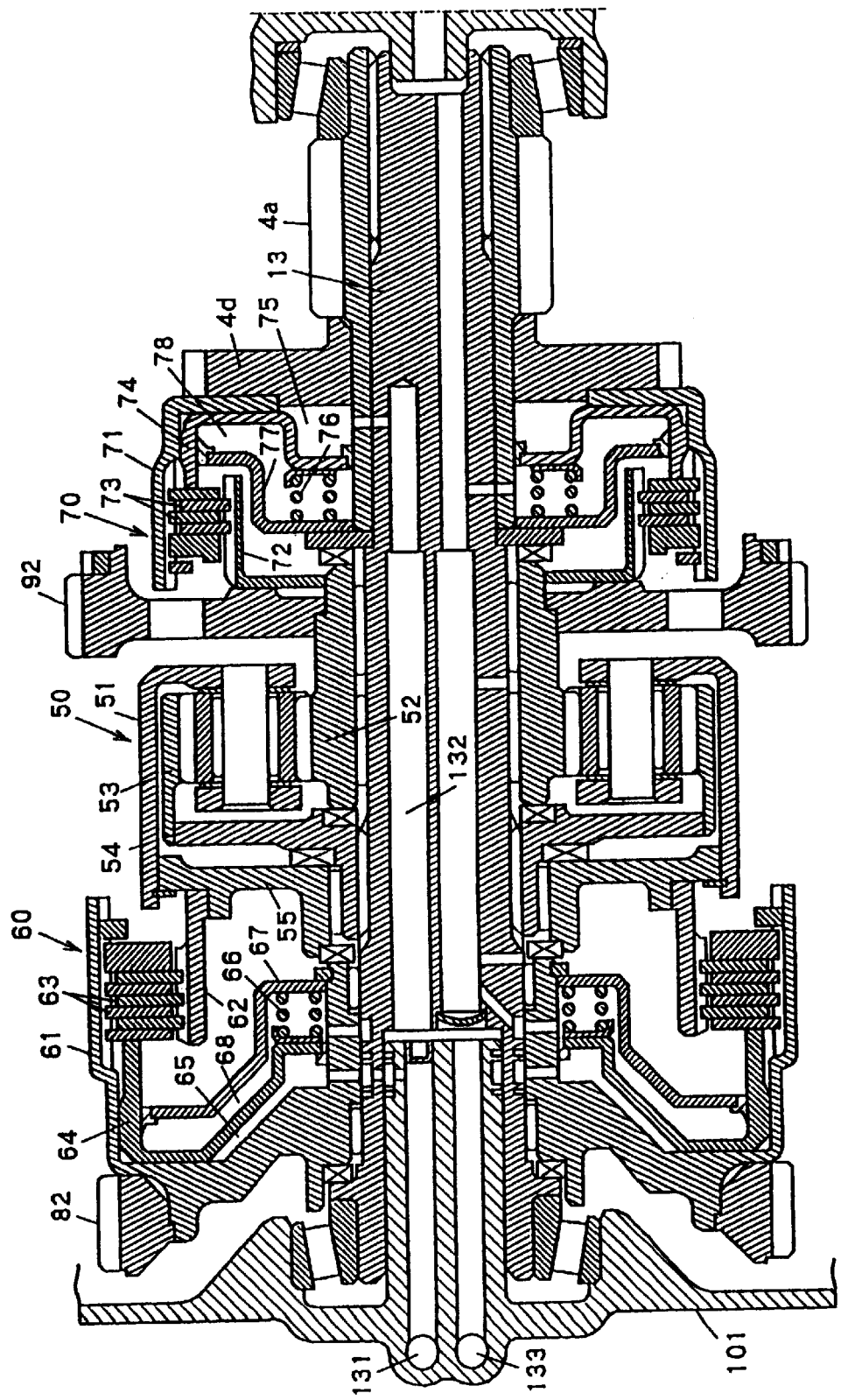
FIG. 6 is an enlarged cross-sectional view of a secondary input shaft and parts mounted on the secondary shaft.

Referring to FIG. 6 showing the planetary gear mechanism 50 and low and high mode clutches 60 and 70, the secondary shaft 13 at its opposite ends is supported for rotation by transmission end covers 101 and 103 through bearings 141 and 142, respectively. The secondary shaft 13 at its middle portion mounts thereon the high mode second gear 92 and the planetary gear mechanism 50 adjacent to the high mode second gear 92 on one side remote from the engine 1. The sun gear 52 of the planetary gear mechanism 50 is meshed with the high mode second gear 92. A splined sleeve flange 54 with an external gear is placed on the splined end of the secondary shaft 13 behind the planetary gear mechanism 50 and is meshed with the internal gear 53 of the planetary gear mechanism 50. Further, the low mode clutch 60 is mounted for rotation on the secondary shaft 13 behind the sleeve flange 54. This low mode clutch 60 comprises an internally splined clutch drum 61 to which the low mode second gear 82 is secured, an externally splined clutch hub 62 disposed radially inside the clutch drum 61 and connected to a flange 55 by means of an externally splined pinion carrier 51, a plurality of splined clutch plates 63 alternately coupled to both clutch drum 61 and clutch hub 62, and a spring loaded piston 64 installed within the clutch drum 61. The clutch drum 61 defines a hydraulic chamber 65 therein behind the piston 64. The piston 64 is forced axially toward the planetary gear mechanism 50 against a spring 66 by coupling hydraulic pressure supplied into the hydraulic pressure chamber 65 by a clutch control unit 120 (see FIG. 3), so as to frictionally couple the clutch plates 63 all together, thereby bringing the low mode second gear 82 and the pinion carrier 51 into engagement with each other. The piston 64 is provided with a balancing piston 67 secured to its front wall to provide a balancing hydraulic chamber 68 therebetween. Lubrication oil in the balancing hydraulic pressure chamber 68 cancels thrust force unevenly acting on the piston 64 by means of centrifugal force acting on the oil in the hydraulic pressure chamber 65. Adjacent to the high mode second gear 92 there is a high mode clutch 70. The high mode clutch 70 comprises an internally splined clutch drum 71 which is coupled to a first gear 4a of the output gear train 4 placed on the splined secondary shaft 13 through a parking gear 4d, an externally splined clutch hub 72 disposed radially inside the clutch drum 71 and connected to the high mode second gear 92, a plurality of splined clutch plates 73 alternately coupled to both clutch drum 71 and clutch hub 72, and a spring loaded piston 72 installed within the clutch drum 71. The clutch drum 71 defines a hydraulic pressure chamber 75 therein behind the piston 74. The piston 74 is forced axially toward the planetary gear mechanism 50 against a spring 76 by coupling hydraulic pressure applied into the hydraulic pressure chamber 75 by the clutch control unit 120, so as to frictionally couple the clutch plates 73 all together, thereby bringing the high mode second gear 92 and the first gear 4a of the output gear train 4 placed on the splined secondary shaft 13. The piston 74 is provided with a balancing piston 77 secured to its back wall to provide a balancing hydraulic pressure chamber 78 therebetween. Lubrication oil in the balancing hydraulic pressure chamber 78 cancels thrust force unevenly acting on the piston 74 by means of centrifugal force acting on the oil in the hydraulic pressure chamber 75.

The transmission end cover 101 is provided with axial oil paths 131 and 133. Hydraulic oil from the clutch control unit 120 is supplied to the hydraulic pressure chamber 65 of the low mode clutch 60 through the axial oil path 131 and to the hydraulic pressure chamber 75 of the high mode clutch 70 through the axial oil path 133 via an axial oil path 132 formed in the secondary shaft 13.

[0078] In the mechanical operation of the continuously variable transmission 10, while the vehicle is stopping, in the low mode control where the low mode clutch 60 is locked and the high mode clutch 70 is released, rotation of the engine 1 is transmitted to the secondary shaft 12 from the input shaft 11 through the low mode gear train 80 comprising the first gear 81, the idle gear 83 and the second gear 82 and simultaneously transmitted to the planetary gear mechanism 50 through the pinion carrier 51 via the low mode clutch 60. The rotation imparted to the input shaft 11 is transmitted to the input disk 21 of the first toroidal continuously variable gear mechanism 20 from the low mode first gear 81 through the loading cam 40 and further transmitted to the integrated output disk 34 through the rollers 23. Simultaneously, the rotation is imparted to the input disk 31 of the second toroidal continuously variable gear mechanism 30 from the input disk 21 of the first toroidal continuously variable gear mechanism 20 through the primary shaft 12 and further transmitted to the integrated output disk 34 through the rollers 23. At this time, the speed change control unit 110 controls the hydraulic pressure P$_H$ for speed increase or the hydraulic pressure P$_L$ for speed reduction to hold the rollers 23 of the first and second toroidal continuously variable gear mechanisms 20 and 30 at an inclination angle for a specified gear ratio. The rotation imparted to the integrated output disk 34 is further transmitted to the sun gear 52 of the planetary gear mechanism 50 through the high mode gear train 90 comprising the first and second high mode gears 91 and 92. At this time, the speed change control unit 110 controls the hydraulic pressure P$_H$ for speed increase or the hydraulic pressure P$_L$ for speed reduction to hold the rollers 23 of the first and second toroidal continuously variable gear mechanisms 20 and 30 at an inclination angle for a given gear ratio. In this way, the planetary gear mechanism 50 receives the rotation through both pinion carrier 51 and sun gear 52. The carrier 51 and the sun gear 52 rotate at a same speed due to the control of gear ratio of the first and second toroidal continuously variable gear mechanisms 20 and 30, not causing rotation of the internal gear 53 of the planetary gear mechanism 50, i e. rotation transmitted to the differential 5 from the secondary shaft 12 through the output gear ratio 4, at all. As a result, the continuously variable transmission 10 remains put in a geared neutral state. When varying the gear ratios of the first and second toroidal continuously variable gear mechanisms 20 and 30 to cause a change in speed ratio between rotation imparted to the pinion carrier 51 and the sun gear 52, respectively, the internal gear 13 rotates in either direction to cause the vehicle to start forward or backward in the low mode control in which the continuously variable transmission 10 is at a high resultant gear ratio.

Figure 7:
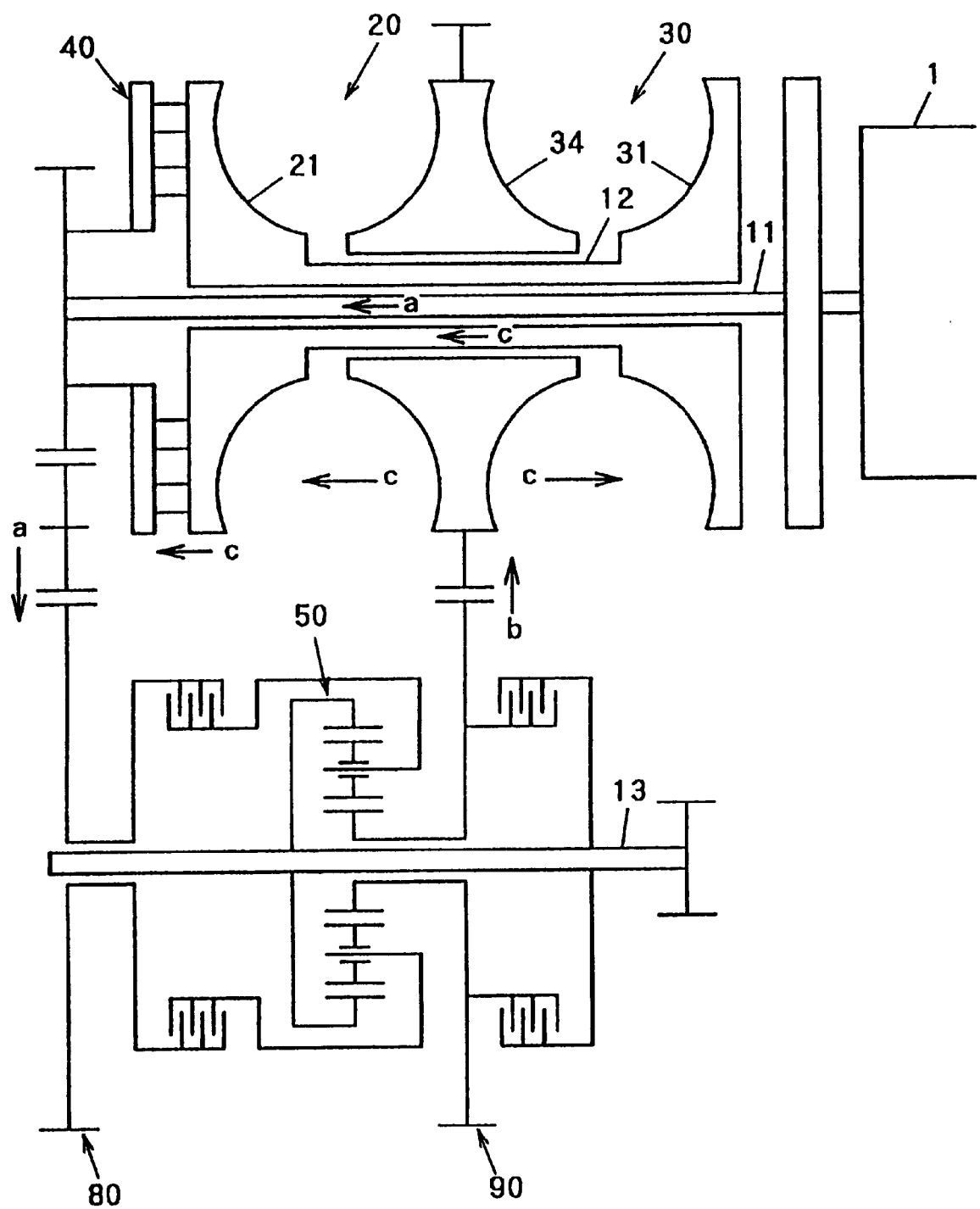
FIG. 7 is a schematic skeleton view of a reflux or circulating torque flow in the toroidal type continuously variable transmission in accordance with an embodiment of the invention.

In the low mode gear ratio control, as schematically shown in FIG. 7, while the engine torque is transmitted to the secondary shaft 13 through the low mode gear train 80 via one end of the input shaft 11 remote from the engine 1 as indicated by an arrow a, a torque is circulated as reaction force caused in the planetary gear mechanism 50 to the integrated output disk 34 of the first and second toroidal continuously variable gear mechanisms 20 and 30 via the high mode gear train 90 as indicated by an arrow b. This recirculating torque is returned again to the low mode gear train 80 via the input toroidal disks 21 and 31, the primary shaft 12 and the loading cam 40 as indicated by an arrow b. Accordingly, in the low mode gear ratio control, torque is transmitted in reverse direction to the input disks 21 and 23 of the first and second toroidal continuously variable gear mechanisms 20 and 30 from the integrated output disk 34. On the other hand, when releasing the low mode clutch 60 and locking the high mode clutch 70 simultaneously at a specified timing after the vehicle starts to move forward, rotation imparted to the input shaft 11 from the engine 1 is admitted to the input disks 21 and 31 of the first and second toroidal continuously variable gear mechanisms 20 and 30 through the loading cam 40 and further to the integrated output disk 34 through the rollers 23 and 33, and then further imparted to the secondary shaft 13 through the high mode clutch 70 via the high mode gear train 90. At this time, the planetary gear mechanism 50 races, the continuously variable transmission 10 provides a resultant gear ratio depending only upon the gear ratios of the first and second toroidal continuously variable gear mechanisms 20 and 30. In other words, the continuously variable transmission 10 is controlled to continuously vary its resultant gear ratio in the high mode gear ratio control.

Figure 8:
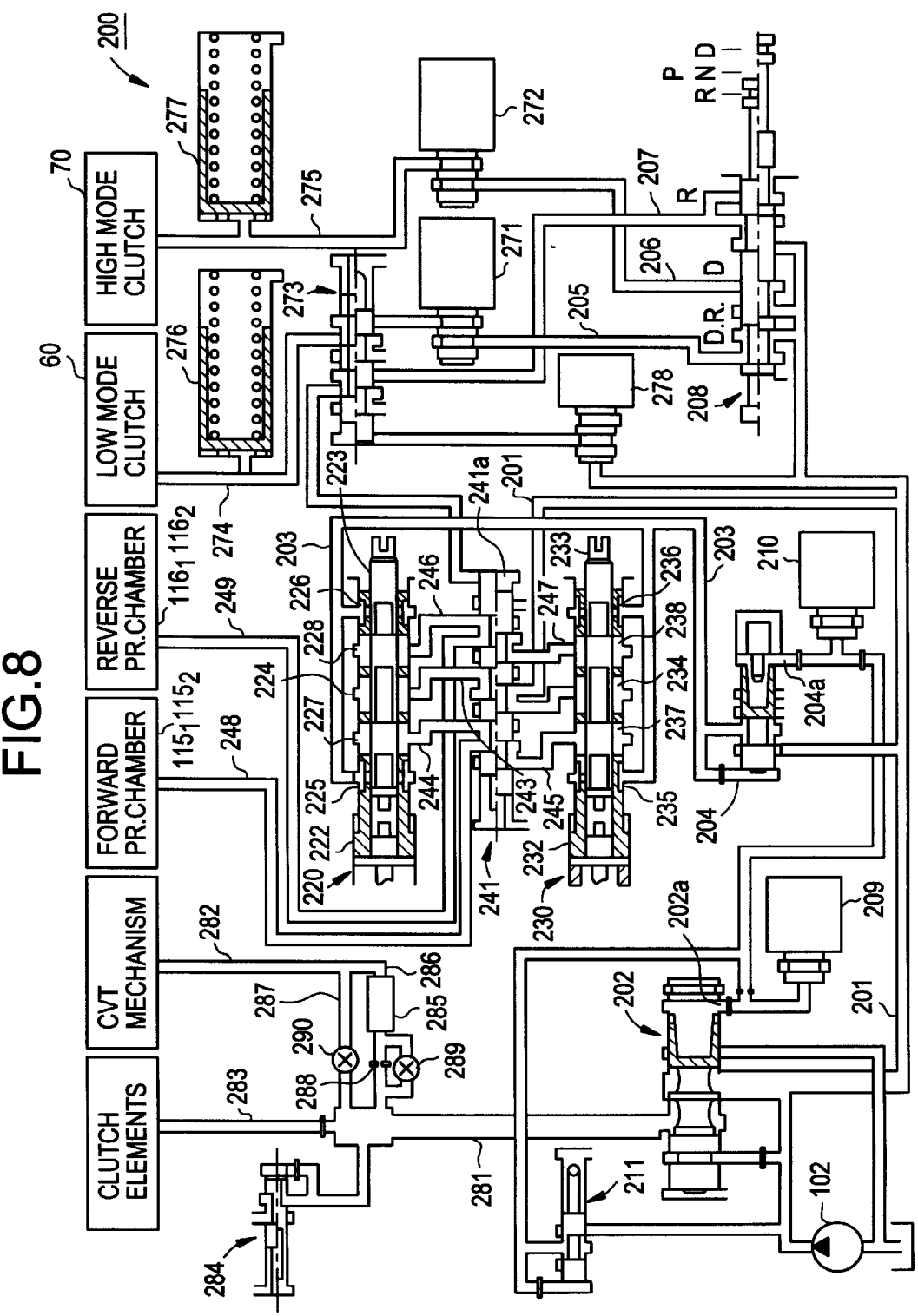
FIG. 8 is a hydraulic circuit diagram of the toroidal type continuously variable transmission.

FIG. 8 shows the hydraulic control circuit 200 comprised of the speed change control unit 110 and the clutch control unit 120 by which the continuously variable transmission 10 is controlled in operation. The hydraulic control circuit 200 includes various spool valves, namely a regulator valve 201 for regulating the pressure of a working oil discharged from the oil pump 102 to a specified level of pressure and delivering it into a main pressure line 201, a relief valve 204 for regulating the primary pressure in the main pressure line 201 to a specified level of relief pressure and delivering it into a relief pressure line 203, and a manual shift valve 208 operated by a manual range shift stick (not shown) to bring the main pressure line 201 into communication with first and second primary pressure lines 205 and 206 in a drive (D) range or with first and third primary pressure line 205 and 207 in a reverse (R) range or to disconnect communication of the main pressure line with all of the first to third primary pressure lines 205–207 in a neutral (N) range or a park (P) range. The regulator valve 202 and the relief valve 204 are accompanied with linear solenoid valves 209 and 210, respectively. Each linear solenoid valve 209, 210 generates a control pressure based on a pressure regulated to a specified level by a reducing valve 211. The regulator valve 202 receives the control pressure at its control pressure port 202a to regulate the specified level of line pressure. Similarly, the relief valve 204 receives the control pressure at its control pressure port 204a to regulate the specified level of relief pressure.

The hydraulic control circuit 200 further includes three spool valves, namely a double-slider forward shift valve (which will be refereed to as a forward shift valve for simplicity) 220 for developing a speed increase hydraulic pressure P$_H$ according a line pressure and a relief pressure in the drive (D) range, a double-slider reverse shift valve (which will be refereed to as a reverse shift valve for simplicity) 230 for developing a speed reduction hydraulic pressure P$_L$ in the reverse (R) range, and a shift valve 241 for actuating selectively the shift valves 220 and 230. The shift valve 241 shifts its spool between two positions according to whether a pressure is present at the control pressure port 241a. Specifically, the shift valve 241 shifts the spool to the right end position as seen in FIG. 10 to bring the main pressure line 201 into communication with a line pressure line 242 leading to the forward shift valve 220 when receiving no line pressure at the control pressure port 241a, or to the left end position to bring the main pressure line 201 into communication with a pressure line 243 leading to the reverse shift valve 230 when receiving the line pressure at the control pressure port 241a. The shift valves 220 and 230 are of the same structure. The forward shift valve 220 has an outer sleeve 222 fitted for axial slide movement into an axial bore 221 (see FIG. 11) formed in a valve body 111a of the hydraulic control section 111 of the shift control unit 110 and an inner sleeve 223 fitted for axial slide movement into the outer sleeve 222, and the reverse shift valve 230 has a sleeve 232 fitted for axial slide movement into an axial bore 231 (see FIG. 9) formed in a valve body 111a of the hydraulic control section 111 of the shift control unit 110 and an inner sleeve 233 fitted for axial slide movement into the outer sleeve 232. The forward shift valve 220 has five ports, namely a line port 224 disposed at the middle in an axial direction and connected to the line pressure line 242, first and second relief ports 225 and 226 disposed at opposite ends and connected to the relief pressure line 203, a speed increase pressure port 227 disposed between the line pressure port 224 and the first relief port 225 and a speed reduction pressure port 228 disposed between the line pressure port 224 and the second relief port 226. Similarly, the reverse shift valve 230 has five ports, namely a line pressure port 234 disposed at the middle in an axial direction and connected to the line pressure line 242, first and second relief ports 235 and 236 disposed at opposite ends and connected to the relief pressure line 203, a speed increase pressure port 237 disposed between the line pressure port 234 and the first relief port 235 and a speed reduction pressure port 238 disposed between the line pressure port 234 and the second relief port 236.

The pressure lines 244 and 245 respectively extending from the speed increase pressure ports 227 and 237 of the forward and reverse shift valve 220 and 230 and the pressure lines 246 and 247 respectively extending from the speed reduction pressure ports 228 and 238 of the forward and reverse shift valve 220 and 230 are connected to the shift valve 241. Shift valve 241 places its valve spool to the right end position to bring the pressure lines 244 and 246 extending from the speed increase and reduction pressure ports 227 and 228 of the forward shift valve 220, respectively, into communication with a pressure line 248 leading to the speed increase pressure chambers 115$_1$ and 115$_2$ of the trunnion driving section 112 and a pressure line 249 leading to the speed reduction pressure chambers 116$_1$ and 116$_2$ of the trunnion driving section 112, respectively. On the other hand, the shift valve 241 places its valve spool to the left end position to bring the pressure lines 245 and 247 extending from the speed increase and reduction pressure ports 237 and 238 of the reverse shift valve 230, respectively, into communication with the pressure lines 248 and 249, respectively.

When the forward shift valve 220 shifts the valve sleeve 222 in position toward the right relative to the valve spool 223 from a neutral position shown in FIG. 8, the valve sleeve 222 increases an inter-communication opening between the line pressure port 224 and the speed increase pressure port 227, and an inter-communication opening between the second relief port 226 and the speed reduction pressure port 228. As a result, the speed increase hydraulic pressure P$_H$ rises and the speed decrease hydraulic pressure P$_L$ drops. Conversely, when the forward shift valve 220 changes the valve sleeve 222 in position toward the left relative to the valve spool 223 from the neutral position, the valve sleeve 222 increases an inter-communication opening between the line pressure port 224 and the speed reduction pressure port 228, and an inter-communication opening between the first relief port 225 and the speed increase pressure port 227, so that the speed increase hydraulic pressure P$_H$ rises and the speed decrease hydraulic pressure P$_L$ drops.

Figure 9:
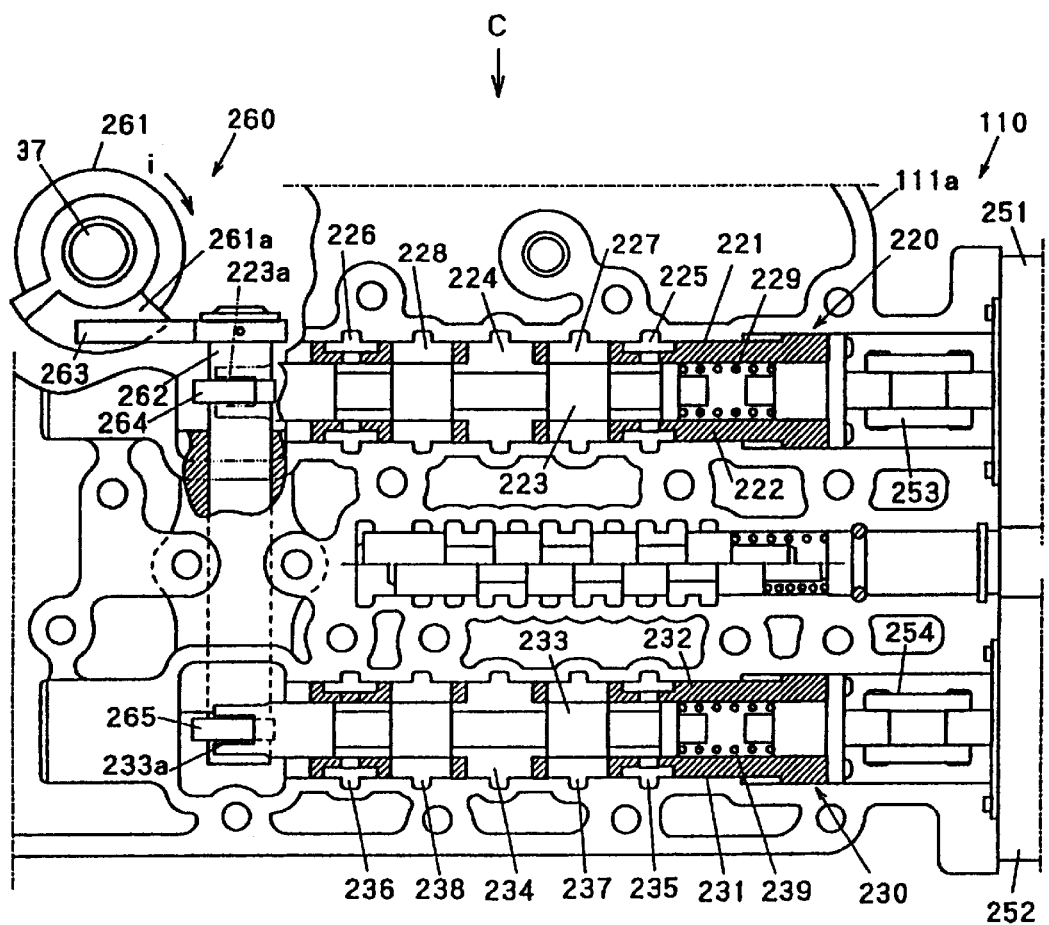
FIG. 9 is a partial cross-sectional view of a three-way valve for generating transmission control hydraulic pressure as viewed in a direction B in FIG. 3.
Figure 10:
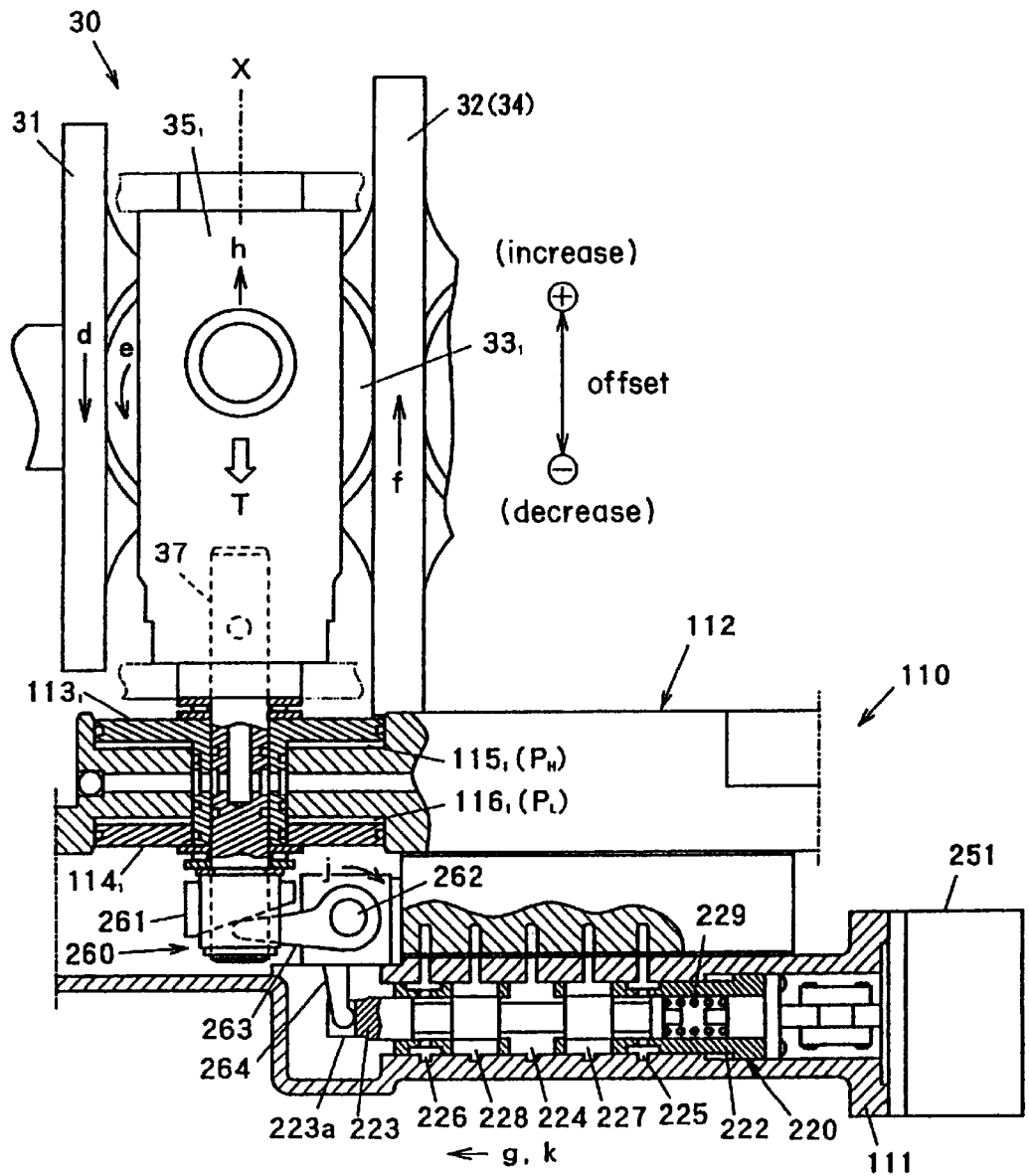
FIG. 10 is a partial cross-sectional view of a cam mechanism as viewed in a direction C in FIG. 3.

FIGS. 9 and 10 show a cam mechanism 260 which moves axially each spool 223, 233 of the forward and reverse shift valves 220 and 230 against a return spring 229, 239 according to axial movement of the valve sleeve 222, 23$_2$ caused by a stepping motor 251, 252. The stepping motors 251 and 252 are connected to the valve sleeves 222 and 232 through connecting members 253 and 254, respectively. The cam mechanism 260 includes a cam 261, a shaft 262, a cam follower lever or slider 263 and drive levers 264 and 265. The cam 261 having a cam face 261a is mounted to a trunnion rod 27 of the trunnion 25 of the second toroidal continuously variable gear mechanism 30. The shaft 262 is disposed adjacent and perpendicularly to the valve spools 223 and 233 and supported for rotation by the valve body 111a of the hydraulic control section 111. The cam follower lever 263 is attached at one of its ends to the shaft and is forced at another end to contact with the cam face 261a of the cam 261. The drive lever 264 for forward shift is attached at one of its ends to the shaft 262 and is engaged at another end with an end key slot 223a of the valve spool 223 of the forward shift valve 220. Similarly, the drive lever 265 for reverse shift is attached at one of its ends to the shaft 262 and is engaged at another end with an end key slot 233a of the valve spool 233 of the reverse shift valve 230.

When the first roller 33$_1$ of the second toroidal continuously variable gear mechanism 30 inclines to turn the trunnion 25$_1$ and trunnion rod 27 together about the axis X1, the cam 261 turns to force the cam follower lever 263, as a result of which the drive levers 264 and 265 are turned through a same angle by means of the shaft 262. In this way, the valve spools 223 and 233 of the forward and reverse shift valve 220 and 230 are axially shifted according to the angle of inclination of the roller first roller 33$_1$. Accordingly, the axial spool position depends upon the angle of inclination of the rollers 33 of the second toroidal continuously variable gear mechanism 30, and also of the rollers 23 of the first toroidal continuously variable gear mechanism 20, i.e. upon the resultant gear ratio of the toroidal continuously variable gear mechanisms 20 and 30.

Referring back to FIG. 8, the hydraulic pressure control circuit 200 is provided with first and second solenoid valves 271 and 272 for clutch control. The first solenoid valve 271 is communicated with the manual shift valve 208 through the first primary pressure line 205. Similarly, the second solenoid valve 272 is communicated with the manual shift valve 208 through the second primary pressure line 206. When the first solenoid valve 271 opens, a clutch locking pressure produced by regulating the line pressure from the first primary pressure line 205 is supplied into the hydraulic pressure chamber 65 of the low mode clutch 60 through a clutch pressure line 274 via a fail-safe valve 273 to lock up the low mode clutch 60. Similarly, when the second solenoid valve 272 opens, a clutch locking pressure produced by regulating the line pressure from the second primary pressure line 206 is supplied into the hydraulic pressure chamber 75 of the high mode clutch 70 through a clutch pressure line 275 to lock up the high mode clutch 70. The clutch pressure lines 274 and 275 are accompanied with accumulators 276 and 277, respectively, to provide gradual development of the clutch locking pressure in the hydraulic pressure chambers 65 and 75 so as thereby to prevent an occurrence of shift shocks. The third primary pressure line 207 extending from the manual shift valve 208 is connected to the control pressure port 241a of the shift valve 241 via the fail-safe valve 273. The shift valve 241 receives a line pressure at its control pressure port 241a to place the valve spool to the left end position (reverse position) when the manual shift valve 208 is in the reverse (R) range position. The fail-safe valve 273 is accompanied with a solenoid valve 278. The solenoid valve 278 provides a control pressure to force the valve spool of the fail-safe valve 273 to the right end position so as thereby to bring the first primary pressure line 205 in communication with the low mode clutch pressure line 274. The solenoid valves 271, 272 and 278 are of a three-way type valve which drains a downstream side when both upstream and downstream sides are shut off.

The hydraulic control circuit 200 is further provided with a lubrication oil line 281 which extends from a drain port of the regulator valve 202 and branches off to a lubrication oil line 282 leading to the first and second toroidal continuously variable gear mechanisms 20 and 30 and a lubrication oil line 283 leading to continuously variable transmission parts other than the toroidal continuously variable gear mechanisms 20 and 30. The lubrication oil line 281 is provided with a relief valve 284 to adjust the lubrication oil at a specified level of pressure. An upstream part of the lubrication oil line 282 branches off into an oil line 286 provided with a cooler 285 for cooling the lubrication oil and an oil line 287 bypassing the cooler 285. The oil line 286 upstream from the cooler 285 is provided with an orifice 288 and a first switch valve 289 disposed in parallel. The bypass oil line 287 is provided with a second switch valve 290. Delivery of the lubrication oil to the first and second continuously variable transmission mechanisms 20 and 30 is controlled by means of the first and second switch valves 289 and 290. According to incoming signals from a control unit 300 (which will e be described in detail later with reference to FIG. 13) comprised mainly of a microprocessor, the second switch valve 290 opens to permit the working oil or lubrication oil to flow to the toroidal continuously variable gear mechanisms 20 and 30 bypassing the cooler 285 when the lubrication oil is at a temperature lower than a specified temperature and at a pressure higher than a specified pressure for the purpose of preventing aggravation of flowability of the lubrication oil due to mechanical resistance of the cooler 285 and preventing the cooler 285 from encountering damages and a decrease in durability due to the high pressure lubrication oil. In all other cases, the second switch valve 290 closes to make the lubrication oil pass through the cooler before reaching the toroidal continuously variable gear mechanisms 20 and 30. By this way, oil films on the toroidal surfaces of the input and output disks 21, 22, 31 and 32 are maintained in good conditions, so as to protect contact surfaces of the toroidal disks with the rollers 23 and 33. The first switch valve 289 opens and closes according to incoming signals from the control unit 300. Specifically, the first switch valve 289 closes when, while the second switch valve 290 remains closed, the engine 1 operates at a speed of rotation lower than a specified speed of rotation and the vehicle runs at a velocity lower than a specified velocity. This is because, in the case of lower engine speeds of rotation and/or lower vehicle velocities, while the toroidal continuously variable gear mechanisms 20 and 30 has a demand for a small amount of lubrication oil, the low and high mode clutches 60 and 70 needs a specified amount of lubrication oil. The lubrication oil supplied to the toroidal continuously variable gear mechanisms 20 and 30 through the lubrication oil line 282 is also supplied to bearings supporting the rollers 23 and 33 through an oil line 282a (see FIG. 3) and sprayed on the toroidal surfaces through a nozzle 282b (see FIG. 3).

Figure 16:
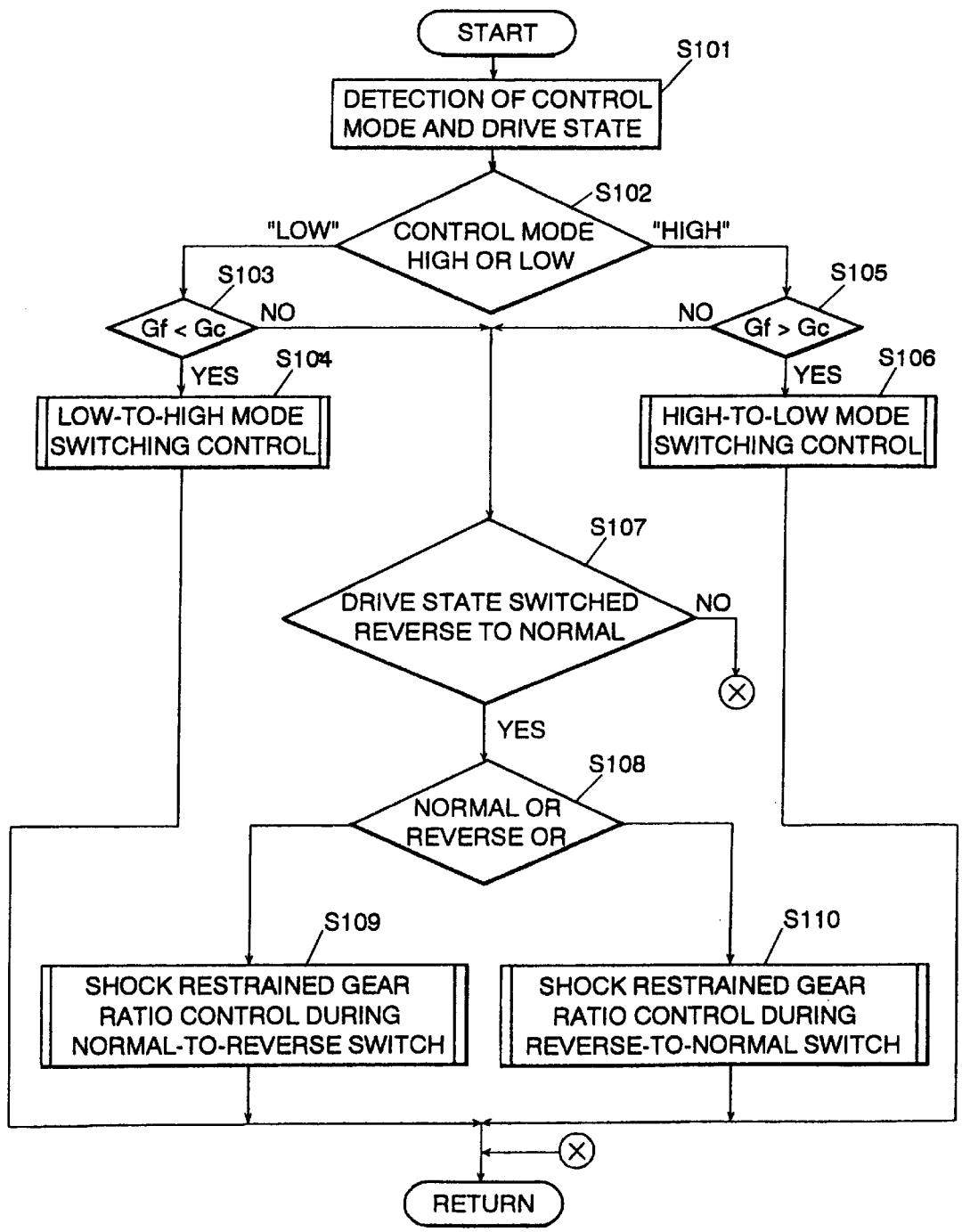
FIG. 16 is a flow chart illustrating a main sequence routine of shift shock restrained gear ratio control for a microprocessor of a control unit.

Gear ratio control of the continuously variable transmission 10 depicted in FIG. 1 is executed through the control unit 300 shown in block diagram in FIG. 16.

Figure 11:
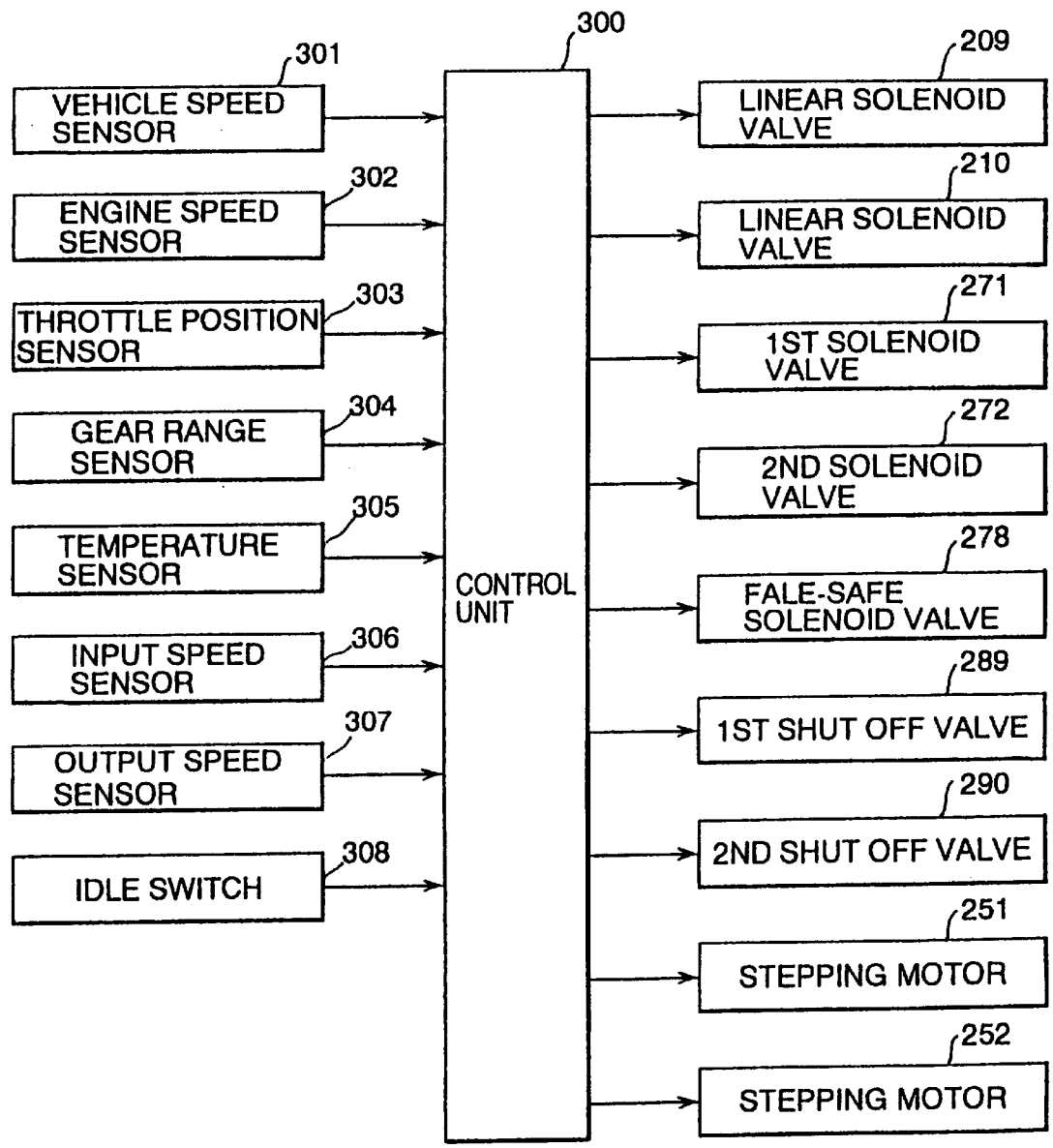
FIG. 11 is a block diagram showing a control system of the toroidal type continuously variable transmission of the invention.

Referring to FIG. 11, the control unit 300 receives various signals from sensors and switches including at least an engine speed sensor 302, a throttle position or opening sensor 303, a transmission position sensor 304, an oil temperature sensor 305, speed sensors 306 and 307 and an idle switch 308. The speed sensor 306 attached to the low mode clutch drum 61 detects a speed of input disk 21 of the first toroidal continuously variable gear mechanism 20, and the speed sensor 307 attached to the second gear 92 of the high mode gear train 90 detects a speed of input disk 31 of the first toroidal continuously variable gear mechanism 30. The idle switch 308 detects release of the accelerator pedal. These sensors and switches are well known in various types in the art and may take any known type. The control unit 300 provides control signals for various solenoid valves 209, 210, 271, 272, 278, 289 and 290, stepping motors 251 and 252, and other electrically controlled elements in the hydraulic control circuit 200 according to driving conditions represented by signals from the switches and sensors 301–308.

The following description will be directed to basic speed change operation of the continuously variable transmission 10. As was previously described above, the hydraulic control circuit 200 shown in FIG. 10 is in the drive (D) range in which the manual shift valve 208 takes the drive (D) position to force the shift valve 241 to maintain the valve spool in the right end position (the forward position). Because the toroidal continuously variable gear mechanisms 20 and 30 shown in FIG. 3 operate in the same way, the explanation will be given relating to the roller 23₁ and trunnion 25₁ of the first toroidal continuously variable gear mechanism 20 by way of example, and the same is true for other rollers and trunnions.

When the hydraulic control circuit 200 is actuated in response to a signal from the control unit 300, the solenoid valves 209 and 210 are actuated to generate a specified level of pressure as a line pressure at the control pressure port 202a of the regulator valve 202 and a specified level of pressure as a relief pressure at the control pressure port 204a of the relief valve 204. The line pressure is supplied to the inlet port 224 of the forward shift valve 220 through the main pressure line 201 and pressure line 242 via the shift valve 241, and the relief pressure is supplied to the first and second relief ports 225 and 226 of the forward shift valve 220 through the pressure line 203. Based on these line pressure and relief pressure, the forward shift valve 220 controls the hydraulic pressure difference ($\Delta P = P_H - P_L$) between a hydraulic pressure $P_H$ for speed increase and a hydraulic pressure $P_L$ for speed reduction. This hydraulic pressure difference control is performed to hold the trunnion 35 and roller 33 in the neutral positions against traction force T exerted on the trunnion 35 or to force them in the axial direction X from the neutral position so as to vary the inclination of the roller for varying the gear ratio of the toroidal continuously variable gear mechanism 30. As shown in FIG. 10, when the roller 33 is driven by the input disk 21 rotating in a direction indicated by an arrow d, these trunnion 35 and roller 33 are applied with force by which they are drawn in the same direction d. On the other hand, when the output disk 32 is rotated in a direction indicated by an arrow f by the roller 33 rotating in a direction indicated by an arrow f, reaction force is exerted as traction force T in a direction opposite to the rotational direction e of the output disk 32 on the roller 33 and trunnion 35. In order to hold the roller 33 in the neutral position against the traction force T, the speed increase and reduction pressure chambers 115 and 116 are supplied with speed increase and speed decrease hydraulic pressures $P_H$ and $P_L$, respectively which are controlled to provide a hydraulic pressure difference ($\Delta P = P_H - P_L$) balanced with the traction force T. When increasing the gear ratio of the toroidal continuously variable gear mechanism 30 for forward drive of the vehicle, the forward shift valve 220 forces the valve sleeve 222 to shift toward in a direction indicated by an arrow g in FIG. 10 to decrease the inter-communication openings between the inlet pressure port 224 and the speed increase pressure port 227 and between the second relief port 226 and the speed reduction pressure port 228. As a result, the hydraulic pressure $P_H$ introduced into the speed increase pressure chamber 115 (see FIG. 8) rises due to the relief pressure which is relatively high, and the hydraulic pressure $P_L$ introduced into the speed reduction pressure chamber 116 drops due to the line pressure which is relatively low, as a result of which the traction force T becomes higher than the hydraulic pressure difference ($\Delta P = P_H - P_L$) to force the trunnion 25 and roller 23 in a direction indicated by an arrow h as shown in FIG. 10. Following the movement, the roller 33 inclines in a direction in which it shifts its contact point with the input disk 31 radially outward and its contact point with the output disk 32 radially inward to reduce the gear ratio. The same inclination of the roller 33 is caused in the second toroidal continuously variable gear mechanism 30. Due to the traction force T exceeding the hydraulic pressure difference ($\Delta P = P_H - P_L$), the roller 33 inclines in a direction in which it shifts its contact point with the input disk 31 radially outward and its contact point with the output disk 32 radially inward following movement of the trunnion 35 in a direction indicated by an arrow h in FIG. 10. At this time, however, the cam 261 of the cam mechanism 260 turns through the same angle as the roller 33 in the same direction as indicated by an arrow i in FIG. 9, as a result of which the cam follower lever 263, and hence the shaft 262 and the drive lever 264, turns in a direction indicated by an arrow j shown in FIG. 10. Consequently, the forward shift valve 220 shifts the valve spool 223 in a direction indicated by an arrow k in FIG. 10, under influence of the return spring 229. Because this direction k is coincident with the direction in which the valve sleeve 222 is shifted by the stepping motor 251, the inter-communication openings between the inlet port 224 and the speed increase pressure port 227 and between the second relief port 226 and the speed reduction pressure port 228 regain their initial balanced positions, so as to balance the hydraulic pressure difference ($\Delta P = P_H - P_L$) with the traction force T, thereby achieving the gear ratio change of the toroidal continuously variable gear mechanism 30. The gear ratio change of the toroidal continuously variable gear mechanism 30 is fixed at the gear ratio. In this instance, the speed change is completed at a point of time that the valve spool 223 reaches the balanced position relative to the valve sleeve 222. Since the neutral position is the position to which the valve sleeve 222 has been shifted by the stepping motor 251 and corresponds to the inclined angle of the roller 33 caused by the cam mechanism 260, the position of the valve sleeve 222 corresponds to the inclined angle of the roller 33, and hence the trunnion 35. This means that the controlled variable of the stepping motor 251 determines the gear ratio of the toroidal continuously variable gear mechanism 30. Accordingly, the gear ratio of the toroidal continuously variable gear mechanism 30 is varied according to the number of pulses applied to the stepping motor 251. The gear ratio control of the toroidal continuously variable gear mechanism 20 is achieved in the same way when the valve sleeve 222 of the forward shift valve 220 has been shifted in the opposite direction. In this instance, the toroidal continuously variable gear mechanism 30 increases its gear ratio.

Figure 12:
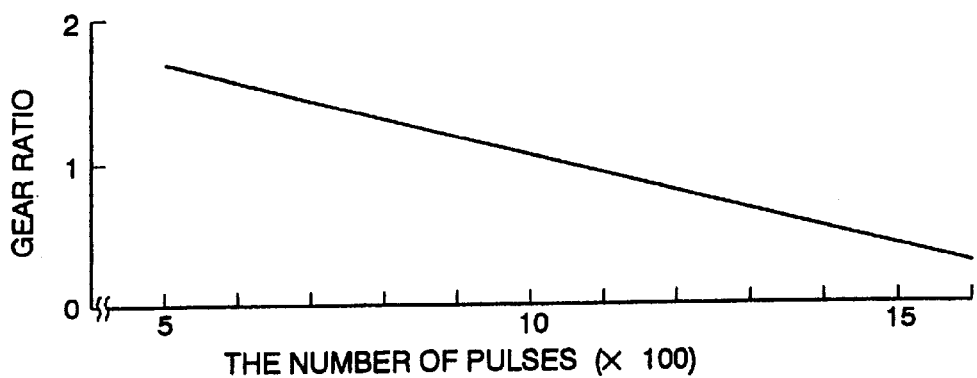
FIG. 12 is a characteristic diagram showing the relationship between the number of pulses applied to a stepping motor and gear ratio of the toroidal mechanism.

FIG. 12 shows the relationship between the number of pulses for the stepping motor 251, 252 and gear ratio of the toroidal continuously variable gear mechanism 20, 30. As apparent, the gear ratio of the toroidal continuously variable gear mechanism 20, 30 decreases with an increase in the number of pulses.

Figure 13:
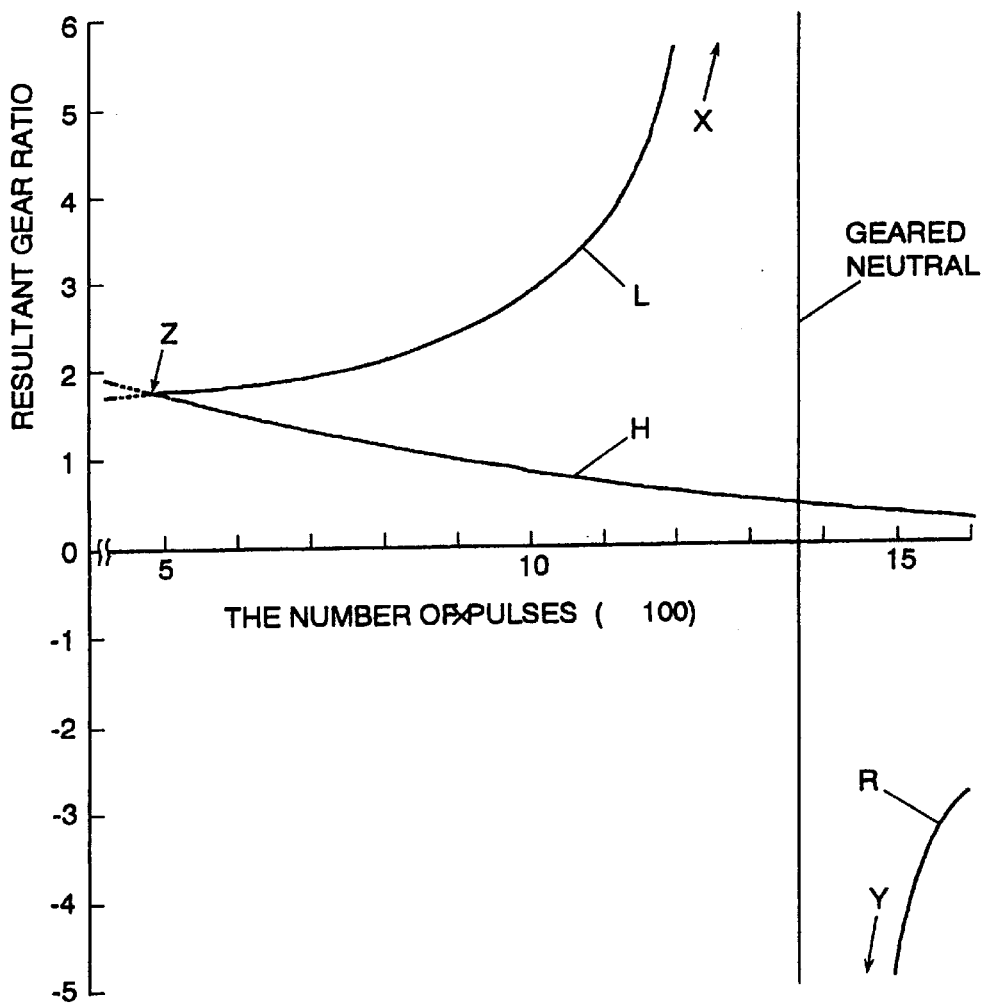
FIG. 13 is a characteristic diagram showing the relationship between the number of pulses applied to a stepping motor and resultant gear ratio of the toroidal type continuously variable transmission.

FIG. 13 shows the relationship between the number of pulses for the stepping motor 251, 252 and resultant gear ratio N of the continuously variable transmission 10 by the control of gear ratios of the toroidal continuously variable gear mechanisms 20 and 30. Although the following description is directed to the toroidal continuously variable gear mechanism 30 only, the same description is true for the toroidal continuously variable gear mechanism 20. As was previously described, while the toroidal continuously variable gear mechanisms 30 changes its gear ratio according to the number of pulses applied to the stepping motors 251 and 261, the continuously variable transmission 10 provides a resultant gear ratio N which differs according to modes of gear ratio control, i.e. according to which mode clutch 60 or 70 has been locked. When the continuously variable transmission 10 is put in the high mode gear ratio control, rotation of the integrated output disk 34 is imparted directly to the secondary shaft 13 through the high mode gear train 90 and the high mode clutch 70 locked up. As shown in FIG. 13, the characteristic curve of resultant gear ratio N of the continuously variable transmission 10 relative to the number of pulses agrees with the characteristic curve of gear ratio of the toroidal continuously variable gear mechanism 30 shown in FIG. 12. It is of course that these gear ratios of the toroidal continuously variable gear mechanism 30 are different from each other according to the difference in diameter of the first and second gears 91 and 92 of the high mode gear train 90 or the number of teeth between the first and second gears 91 and 92 of the high mode gear train 90. On the other hand, when the continuously variable transmission 10 is put in the low mode gear ratio control, while rotation of the engine 1 is imparted to the pinion carrier 51 of the planetary gear mechanism 50 from the input shaft 11 through the low mode gear train 80 and the low mode clutch 60 locked up, rotation of the integrated output disk 34 is imparted to the sun gear 52 of the planetary gear mechanism 50 through the high mode gear train 90. In this case, when the planetary gear mechanism 50 holds the internal gear 53, which is a transmission output gear, at a rotational speed of 0 (zero) by controlling the toroidal continuously variable gear mechanism 30 to provide a specified ratio of input rotational speeds between the pinion carrier 51 and sun gear 52, the continuously variable transmission 10 is put in the geared neutral state in which the internal gear 53 stands still. At this time, while the resultant gear ratio N increases infinitely as indicated by arrows P and Q in FIG. 13, when the numbers of pulses admitted to the stepping motors 251 and 252 are subsequently decreased so that the toroidal continuously variable gear mechanism 30 is forced to increase their gear ratios and the speed of rotation imparted to the sun gear 52 of the planetary gear mechanism 50 drops consequently, the planetary gear mechanism 50 causes the internal gear 53 to start rotation in the forward direction. In this way, the continuously variable transmission 10 reduces its resultant gear ratio N following reduction in the number of pulses admitted to the stepping motor 251, 252, establishing the low mode gear ratio control in the drive (D) range where the resultant gear ratio N varies along the characteristic curve L. These high and low gear ratio control characteristic curves H and L in the drive (D) range intersect at a gear ratio (switchover gear ratio) Gc of, for example, approximately 1.8 indicated by an arrow R which is provided correspondingly to 500 pulses. Accordingly, the gear ratio control is changed over during varying continuously the resultant gear ratio N of the continuously variable transmission 10 by switching lock-up from one to another between the low and high mode clutches 60 and 70 at the toroidal gear ratio. On the other hand, when the number of pulses to the stepping motor 251, 252 is increased subsequently to achievement of the geared neutral state so that the toroidal continuously variable gear mechanism 30 is forced to reduces their gear ratios and the speed of rotation imparted to the sun gear 52 of the planetary gear mechanism 50 rises consequently, the planetary gear mechanism 50 causes the internal gear 53 to start rotation in the reverse direction. In this way, the continuously variable transmission 10 provides the reverse mode of gear ratio control in the reverse (R) range where the resultant gear ratio N increases along the characteristic curve R as the number of pulses increases.

Figure 14:
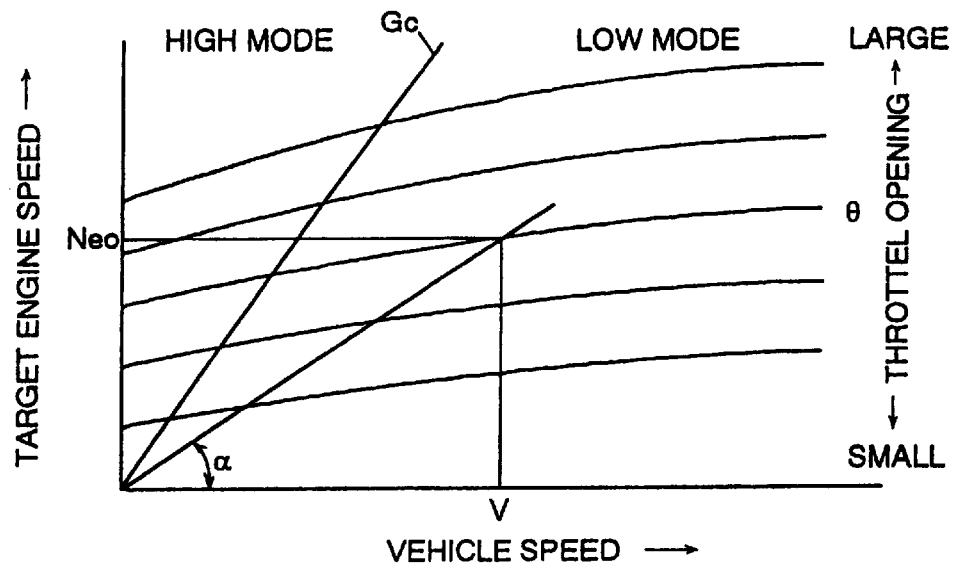
FIG. 14 is a diagrammatic view of an engine speed control map used in gear ratio control.

The control unit 300 controls the resultant gear ratio N of the continuously variable transmission 10 based on the characteristic curves according to driving conditions. Specifically, the control unit 300 detects current vehicle speed V and throttle opening θ based on incoming signals from the speed sensor 301 and throttle position sensor 303 to determine a target engine speed of rotation Neo with reference to a gear ratio control map shown in FIG. 14. Pulsing control of the first and second stepping motor 251 and 252 and locking and unlocking control of the mode clutches 60 and 70 are performed so that the continuously variable transmission 10 provides a resultant gear ratio N (which is represented by an angle α in FIG. 14) corresponding to the target engine speed of rotation Neo on the basis of the resultant gear ratio control curve L, H or R.

Figure 24:
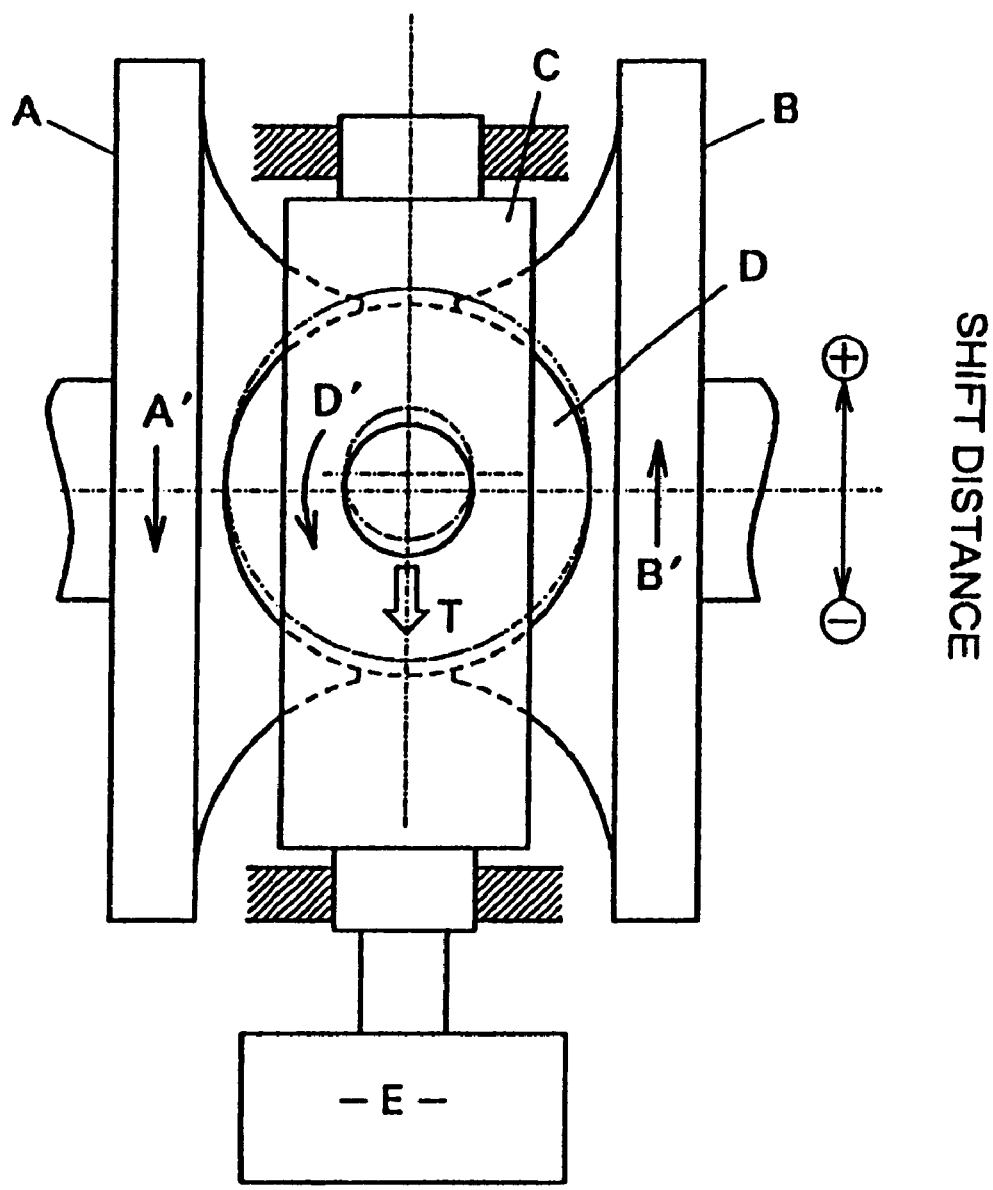
FIG. 24 is an explanatory view illustrating a shift of the roller due to directional reversal of torque transmission through the continuously variable gear mechanism.

Incidentally, as was previously described in connection with FIG. 24, the roller 33 is forced off its neutral position in a direction opposite to the direction of traction force T. Accordingly, when input torque transmitting through the toroidal continuously variable gear mechanism 30 is reversed, the roller 33 switches its shift from one side to another side of the neutral position following reversal of the traction force T in direction.

Figure 15:
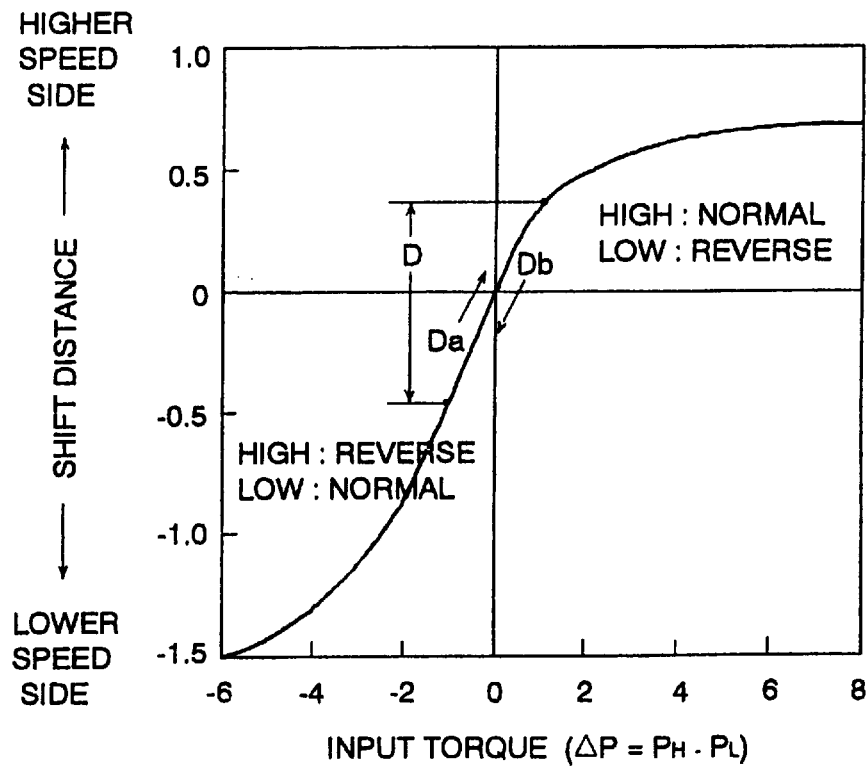
FIG. 15 is a diagrammatic view of a roller shift distance with respect to input torque.

Referring to FIG. 15 showing the relationship between transfer torque through the toroidal continuously variable gear mechanism 30 and shift distance of the roller 33 based on actual measurements. In FIG. 15, the transfer torque passing from the input toroidal disk 31 to the output toroidal disk 32 takes a plus value, and the transfer torque passing from the output toroidal disk 32 to the input toroidal disk 31 takes a minus value. The shift distance D takes a plus value when the roller 33 shifts toward the higher speed side while the transfer torque is plus and takes a minus value when the roller 33 shifts toward the lower speed side while the transfer torque is minus. Accordingly the transfer torque and shift distance D take plus values, respectively, while the toroidal continuously variable gear mechanism 30 is in the normal drive state in the high mode or in the reverse drive state in the low mode, and they take minus values, respectively, while the toroidal continuously variable gear mechanism 30 is in the reverse drive state in the high mode or in the normal drive state in the low mode. When the toroidal continuously variable gear mechanism 30 switches to the low mode from the high mode in the normal drive state or switches to the reverse drive mode from the normal drive state in the low mode, the transfer torque reverses in transfer direction, so that the shift distance D of the roller 33 turns from a minus value to a plus value as indicated by an arrow Da. The roller 33 inclines to change a gear ratio due to a shift thereof following directional reversal of transfer torque, which is always accompanied by a shift shock. The control unit 300 is designed and adapted to perform gear ratio control in which an occurrence of a shift shock is prevented or significantly restrained.

FIG. 16 shows a flow chart illustrating a main sequence routine of the shift shock restrained gear ratio control for the microprocessor of the control unit 300.

When the flow chart logic commences and control proceeds to a function block at step S101 where a current gear ratio control mode and driving conditions are detected. Subsequently, at step S102, a judgement is made as to whether in which mode the toroidal continuously variable gear mechanism 30 is put. when in the low mode, a resultant gear ratio Gf is compared with the switchover gear ratio Gc at step S103. When the resultant gear ratio Gf has dropped below the switchover gear ratio Gc, mode switching control for the switch to the high mode from the low mode (which is hereafter referred to as low-to-high mode switching control) is performed at step S104. On the other hand, when in the high mode, a resultant gear ratio Gf is compared with the switchover gear ratio Gc at step S105. When the resultant gear ratio Gf has risen above the switchover gear ratio Gc, mode switching control for the switch to the low mode from the high mode (which is hereafter referred to as high-to-low mode switching control) is performed at step S106. However, when the resultant gear ratio Gf has not yet dropped below the switchover gear ratio Gc even while the toroidal continuously variable gear mechanism 30 is put in the low mode or when the resultant gear ratio Gf has not yet risen above the switchover gear ratio Gc even while the toroidal continuously variable gear mechanism 30 is put in the high mode, a judgement is made at step S107 as to whether the drive state has been switched. When the drive state has been switched, a further judgement is made at step S308 as to whether the drive state has been switched to the normal state from the reverse state or vice versa. According to switches of the drive state, shift shock restrained gear ratio control separately provided for the switch from the normal state to the reverse state or for the switch from the reverse state to the normal state are executed at step S109 or S110.

Figure 17:
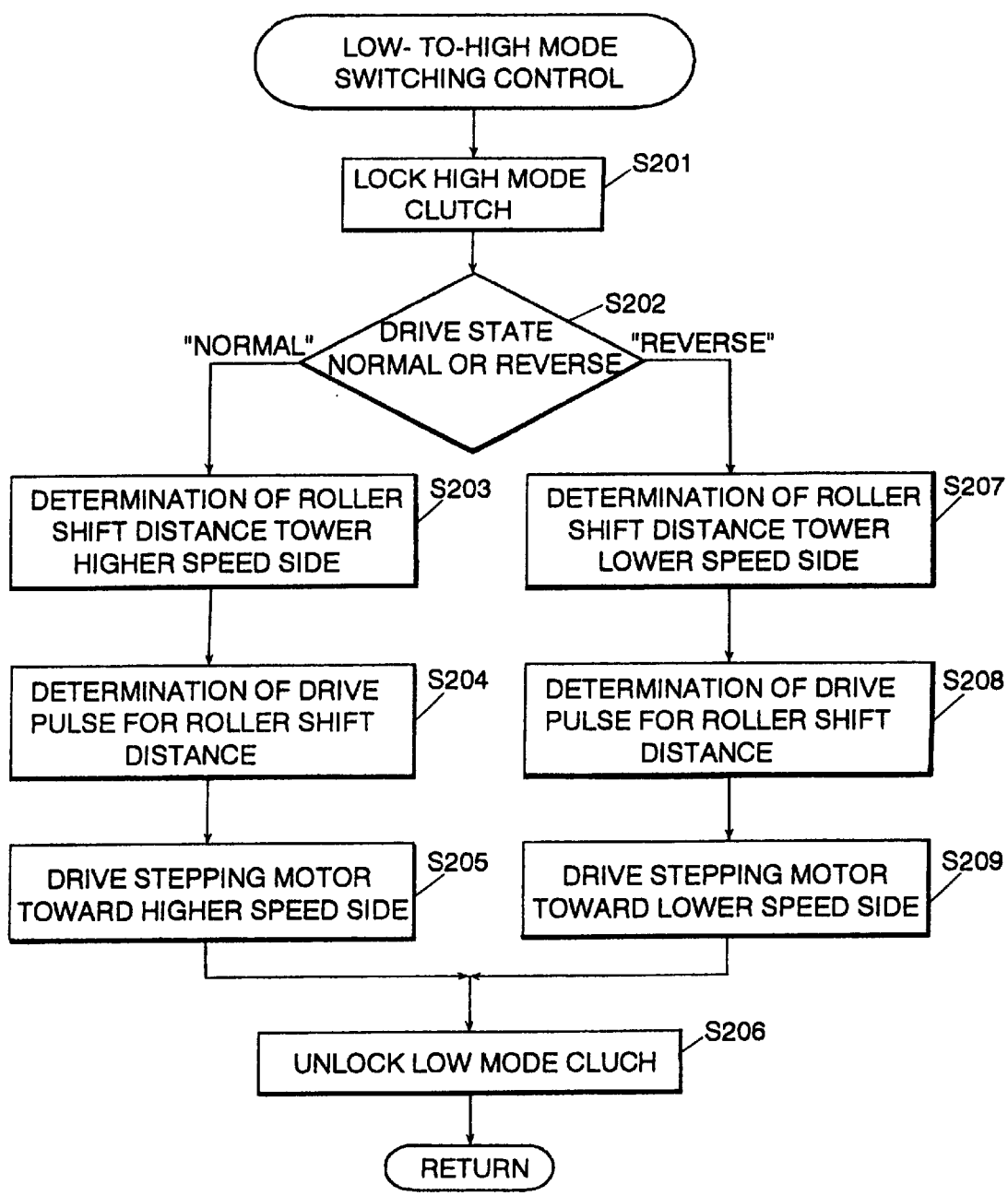
FIG. 17 is a flow chart illustrating a sequence subroutine of low-to-high mode switching control.

FIG. 17 shows a flow chart illustrating a sequence subroutine of the low-to-high mode switchover control for the microprocessor of the control unit 300.

When the low-to-high mode switchover control subroutine commences and control proceeds to a function block at step S201 where the second solenoid valve 272 is actuated to lock the high mode clutch 70. Subsequently, a judgement is made at step S202 as to whether the toroidal continuously variable gear mechanism 30 is in the normal drive state or in the reverse drive state. When the toroidal continuously variable gear mechanism 30 is in the nor mal drive state, a target shift distance of the roller 33 of the toroidal continuously variable gear mechanism 30 toward the higher speed side is determined at step S203. That is, upon an occurrence of switch to the high mode from the low mode in the normal drive state, the toroidal continuously variable gear mechanism 30 turns the transfer of torque in direction to the normal from the reverse direction with a result of turning the shift distance D of the roller 33 to the plus side or the higher speed side from tile minus side or the lower speed side, as indicated by the arrow Da in FIG. 15. In this instance, the shift distance D of the roller 33, which corresponds to input torque to the toroidal continuously variable gear mechanism 30, is determined by the use of a characteristic curve specified in the map shown in FIG. 15. The input torque to the toroidal continuously variable gear mechanism 30 is proportional to the hydraulic pressure difference ($\Delta P = P_H - P_L$) and consequently determined based on the hydraulic pressure difference ($\Delta P = P_H - P_L$).

Thereafter, the number of drive pulses for the stepping motor 251 necessary to move the valve sleeve 222 of the forward shift valve 220 by a distance corresponding to the target shift distance D of the roller 33 is determined at step S204, and the stepping motor 251 is driven with the pulses to shift the roller 33 to the higher speed side at step S205.

On the other hand, when the toroidal continuously variable gear mechanism 30 is in the reverse drive state, a target shift distance of the roller 33 of the toroidal continuously variable gear mechanism 30 toward the lower speed side is determined at step S207. At this time, the toroidal continuously variable gear mechanism 30 turns the transfer of torque in direction to the reverse from the normal direction with a result of turning the shift distance D of the roller 33 to the minus side or the lower speed side from the plus side or the higher speed side, as indicated by the arrow Db in FIG. 15. Thereafter, the number of pulses for the stepping motor 251 necessary to cause the target shift distance D of the roller 33 is determined at step S208, and the stepping motor 251 is driven with the pulses to shift the roller 33 to the lower speed side at step S209.

Subsequently to shifting the roller 33 at step S205 or S209, the first solenoid valve 271 is actuated to unlock the low mode clutch 60 at step S210.

Figure 18:
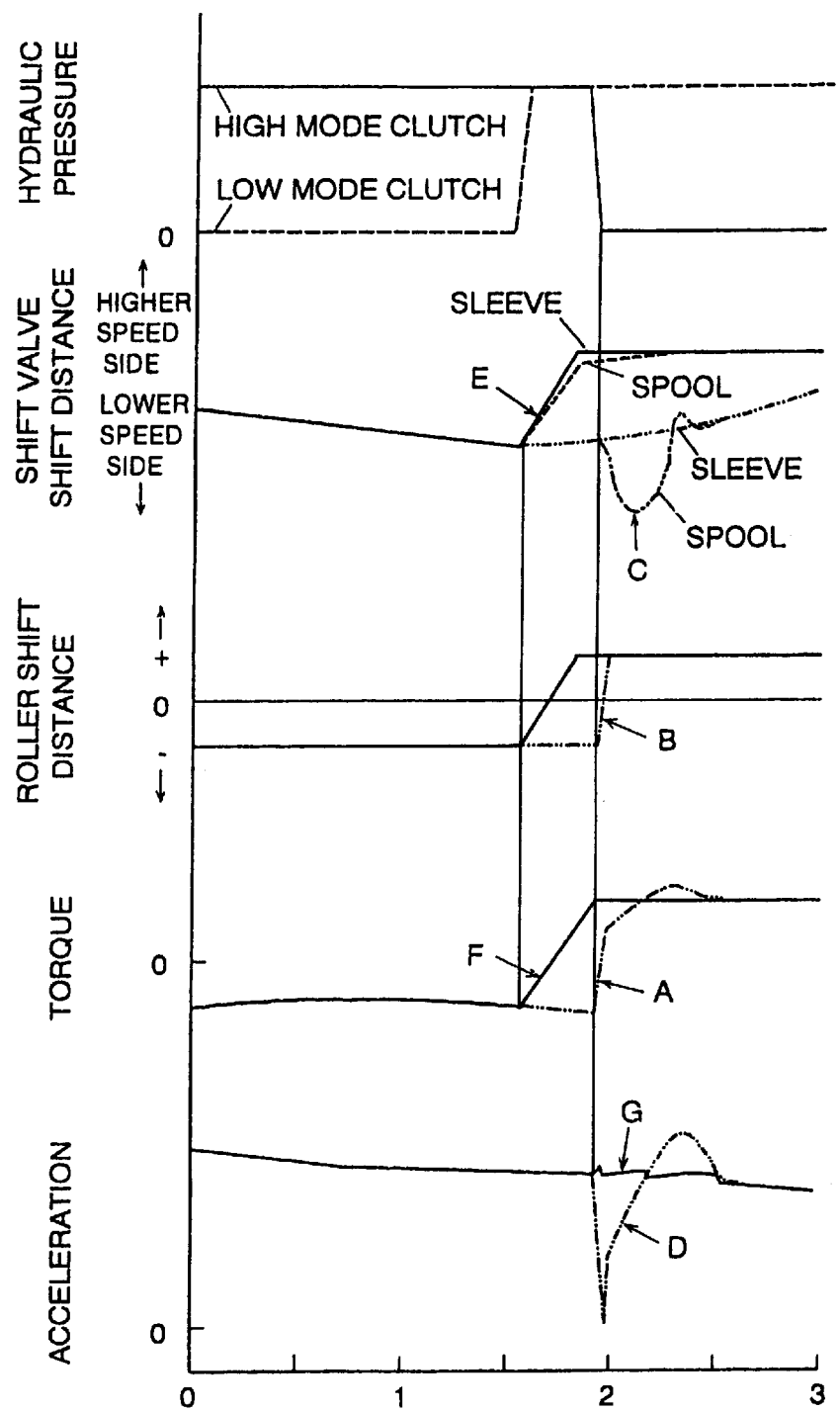
FIG. 18 is a time chart showing changes in control and controlled variables in the low-to-high mode switching control.

Operation of a switch to the low mode from the high mode is hereafter described for the normal drive state by way of example with reference to FIG. 18. If the mode clutches 60 and 70 are alternately locked and unlocked without controlling the forward shift valve 220 to regulate working oil pressure admitted to the roller 33, the toroidal continuously variable gear mechanism 30 turns the transfer of torque in direction to the normal direction from the reverse direction immediately after unlocking the low mode clutch 60 as shown by an arrow A, which is accompanied by a shift of the roller 33 to the plus side as shown by an arrow B. As a result, the roller 33 inclines toward the higher speed side. The inclination of the roller 33 is accompanied by a shift of the valve spool 223 of the shift valve 220 through the trunnion 35 as shown by an arrow C. A sharp change in gear ratio resulting from the inclination of the roller 33 causes a shock as shown by an arrow D.

As contrasted with the above, a shift direction and a shift distance of the roller 33 following directional reversal of the transfer of torque are estimated in a period in which both low and high mode clutches 60 and 70 remain locked and the stepping motor 251 is driven to shift the valve sleeve 222 by a distance corresponding to the estimated shift distance of the roller 33 in the shift direction in advance as shown by an arrow E. An inclination of the roller 33 following the shift causes gradual directional reversal of transfer torque as shown by an arrow F. Since the roller 33 has been shifted by the estimated shift distance at a point of time that the low mode clutch 60 is unlocked, there is no shock due to a sharp change in gear ratio resulting from the inclination of the roller 33 as shown by an arrow G.

Figure 19:
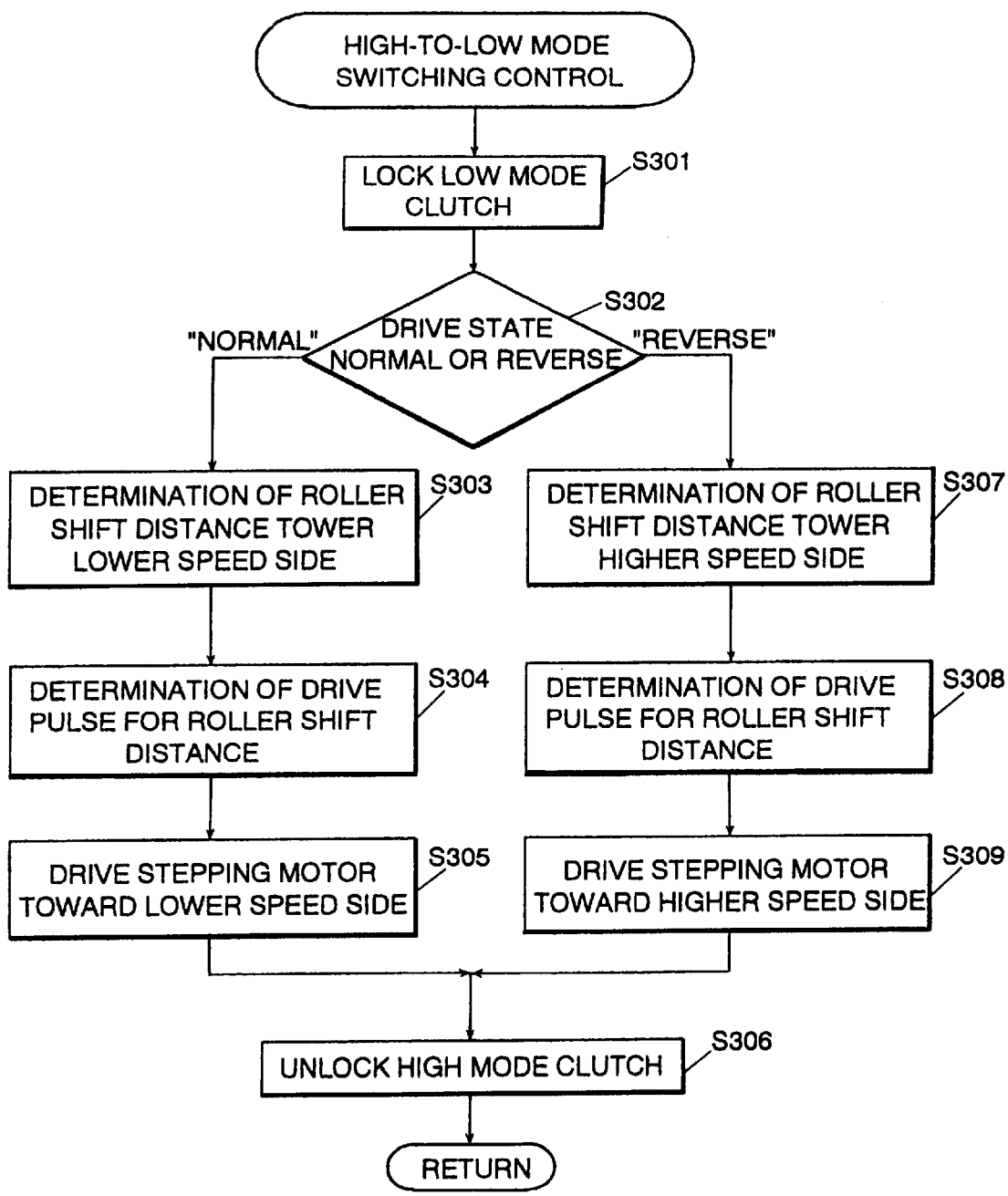
FIG. 19 is a flow chart illustrating a sequence subroutine of high-to-low mode switching control.

FIG. 19 shows a flow chart illustrating a sequence subroutine of the high-to-low mode switchover control for the microprocessor of the control unit 300.

When the low-to-high mode switchover control subroutine commences and control proceeds to a function block at step S301 where the first solenoid valve 271 is actuated to lock the low mode clutch 60. Subsequently, a judgement is made at step S302 as to whether the toroidal continuously variable gear mechanism 30 is in the normal drive state or in the reverse drive state. When the toroidal continuously variable gear mechanism 30 is in the normal drive state, a target shift distance of the roller 33 of the toroidal continuously variable gear mechanism 30 toward the lower speed side is determined at step S303. That is, upon an occurrence of switch to the low mode from the high mode in the normal drive state, the toroidal continuously variable gear mechanism 30 turns the transfer of torque in direction to the reverse from the normal direction with a result of turning the shift distance D of the roller 33 to the minus side or the lower speed side from the plus side or the higher speed side, as indicated by the arrow Db in FIG. 15. Subsequently, the number of drive pulses for the stepping motor 251 necessary to move the valve sleeve 222 of the forward shift valve 220 by a distance corresponding to the target shift distance D of the roller 33 is determined at step S304, and the stepping motor 251 is driven with the pulses to shift the roller 33 to the lower speed side at step S305.

On the other hand, when the toroidal continuously variable gear mechanism 30 is in the reverse drive state, a target shift distance of the roller 33 of the toroidal continuously variable gear mechanism 30 toward the higher speed side is determined at step S307. At this time, the toroidal continuously variable gear mechanism 30 turns the transfer of torque in direction to the normal from the reverse direction with a result of turning the shift distance D of the roller 33 to the plus side or the higher speed side from the minus side or the lower speed side, as indicated by the arrow Da in FIG. 15. Thereafter, the number of pulses for the stepping motor 251 necessary to cause the target shift distance D of the roller 33 is determined at step S308, and the stepping motor 251 is driven with the pulses to shift the roller 33 to the higher speed side at step S309.

Subsequently to shifting the roller 33 at step S305 or S309, the first solenoid valve 271 is actuated to unlock the high mode clutch 70 at step S310.

Figure 20:
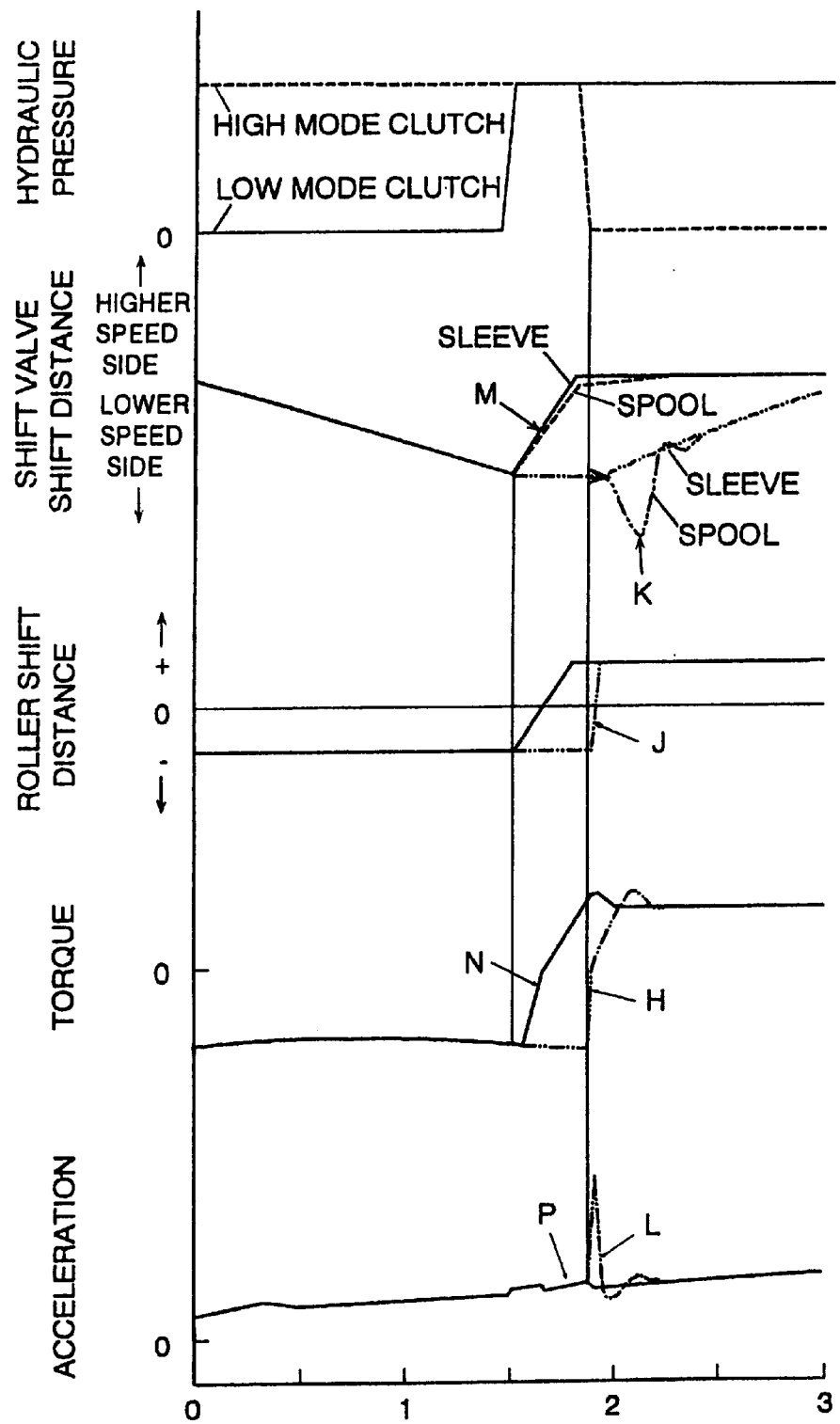
FIG. 20 is a time chart showing changes in control and controlled variables in the high-to-low mode switching control.

Operation of a switch to the low mode from the high mode is hereafter described for the reverse drive state by way of example with reference to FIG. 20. If the mode clutches 60 and 70 are alternately locked and unlocked without controlling the shift valve 220 to regulate working oil pressure admitted to the roller 33, the toroidal continuously variable gear mechanism 30 turns the transfer of torque in direction to the normal direction from the reverse direction immediately after unlocking the high mode clutch 70 as shown by an arrow H, which is accompanied by a shift of the roller 33 to the plus side as shown by an arrow J. As a result, the roller 33 inclines toward the higher speed side. The inclination of the roller 33 is accompanied by a shift of the valve spool 223 of the shift valve 220 as shown by an arrow K. A sharp change in gear ratio resulting from the inclination of the roller 33 causes a shock as shown by an arrow L.

As contrasted with the above, a shift direction and a shift distance of the roller 33 following directional reversal of the transfer of torque are estimated in a period in which both low and high mode clutches 60 and 70 remain locked and the stepping motor 251 is driven to shift the valve sleeve 222 by a distance corresponding to the estimated shift distance of the roller 33 in the shift direction in advance as shown by an arrow M. An inclination of the roller 33 following the shift causes gradual directional reversal of transfer torque as shown by an arrow N. Since the roller 33 has been shifted by the estimated shift distance at a point of time that the low mode clutch 60 is unlocked, there is no shock due to a sharp change in gear ratio resulting from the inclination of the roller 33 as shown by an arrow P. While there is provided a period of time for which both low and high mode clutches 60 and 70 remain locked during a switch of modes, the gear ratio is fixed at the switchover gear ratio Gc for the period of time, so as to prevent the engine from suddenly increasing its speed with an effect of causing a steady shift of the roller 30 under this stable engine operating condition.

Figure 21:
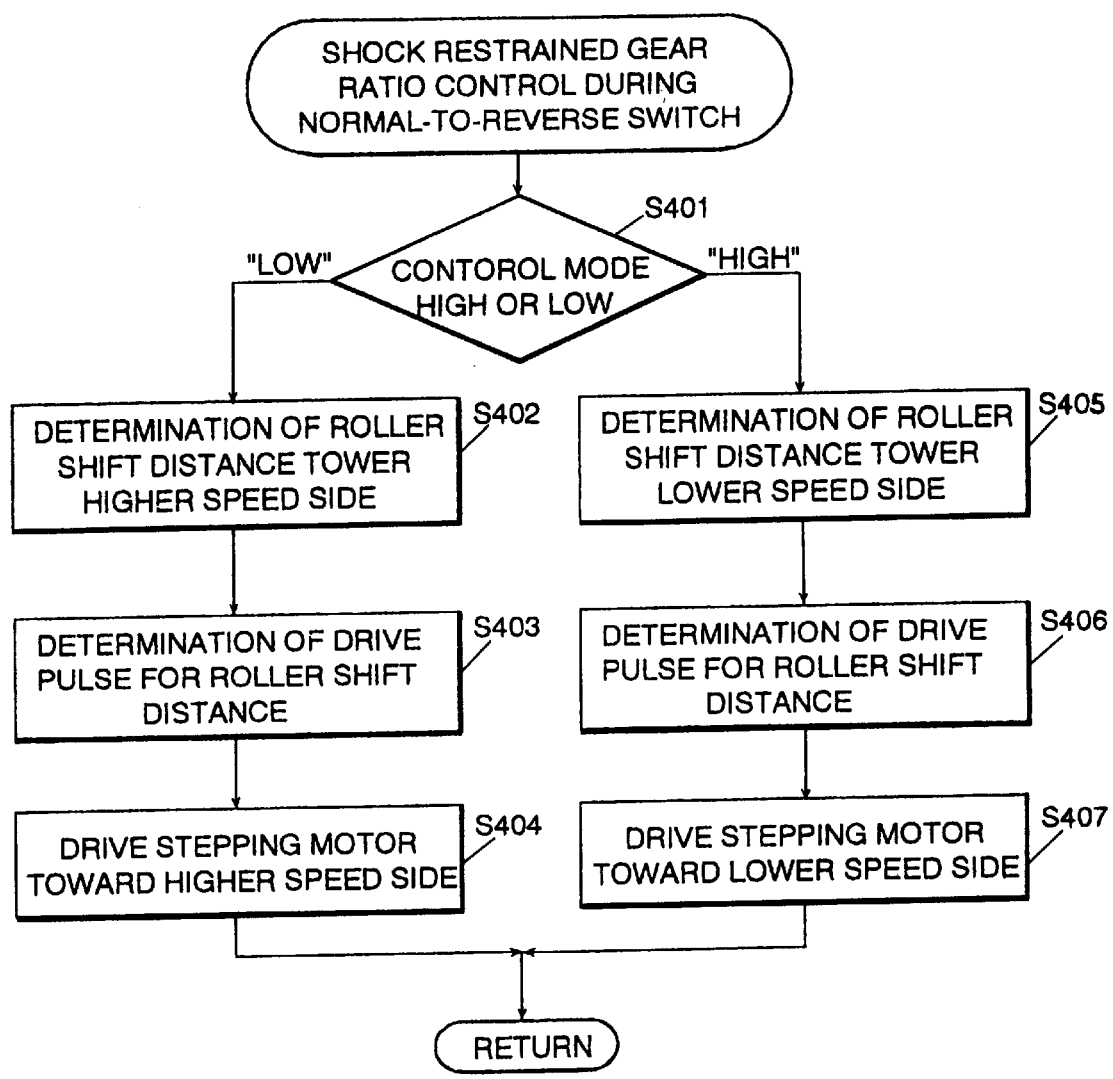
FIG. 21 is a flow chart illustrating a sequence subroutine of normal-to-reverse drive state switching control.

FIG. 21 shows a flow chart illustrating a sequence subroutine of the shift shock restrained gear ratio control during normal-to-reverse state switching for the microprocessor of the control unit 300.

When the low-to-high mode switchover control subroutine commences and control proceeds to a function block at step S401 where a judgement is made as to whether the toroidal continuously variable gear mechanism 30 is in the high mode or in the low mode. When the toroidal continuously variable gear mechanism 30 is in the low mode, a target shift distance of the roller 33 of the toroidal continuously variable gear mechanism 30 toward the higher speed side is determined based on the input torque and gear ratio at step S402. Subsequently, the number of drive pulses for the stepping motor 251 necessary to move the valve sleeve 222 of the forward shift valve 220 by a distance corresponding to the target shift distance D of the roller 33 is determined at step S403, and the stepping motor 251 is driven with the pulses to shift the roller 33 to the higher speed side at step S404.

On the other hand, when the toroidal continuously variable gear mechanism 30 is in the high mode, a target shift distance of the roller 33 of the toroidal continuously variable gear mechanism 30 toward the lower speed side is determined based on the input torque and gear ratio at step S405. Subsequently, the number of pulses for the stepping motor 251 necessary to cause the target shift distance D of the roller 33 is determined at step S406, and the stepping motor 251 is driven with the pulses to shift the roller 33 to the lower speed side at step S407.

That is, upon an occurrence of a switch to the reverse drive state from the normal drive state in the low mode, the toroidal continuously variable gear mechanism 30 turns the transfer of torque in direction to the normal direction from the reverse direction with a result of turning the shift distance D of the roller 33 to the plus side or the higher speed side from the minus side or the lower speed side, as indicated by the arrow Da in FIG. 15.

On the other hand, upon an occurrence of a switch to the reverse drive state from the normal drive state in the high mode, the toroidal continuously variable gear mechanism 30 turns the transfer of torque in direction to the reverse direction from the normal direction with a result of turning the shift distance D of the roller 33 to the minus side or the lower speed side from the plus side or the higher speed side, as indicated by the arrow Db in FIG. 15. By virtue of the control, when it is detected that the accelerator pedal is released for example, the stepping motor 251 is actuated to shift the roller 33 through operation of the shift valve 220 prior to inclination of the roller 33, preventing generation of shocks due to steep shift and inclination of the roller 33 resulting from directional reversal of the transfer of torque.

Figure 22:
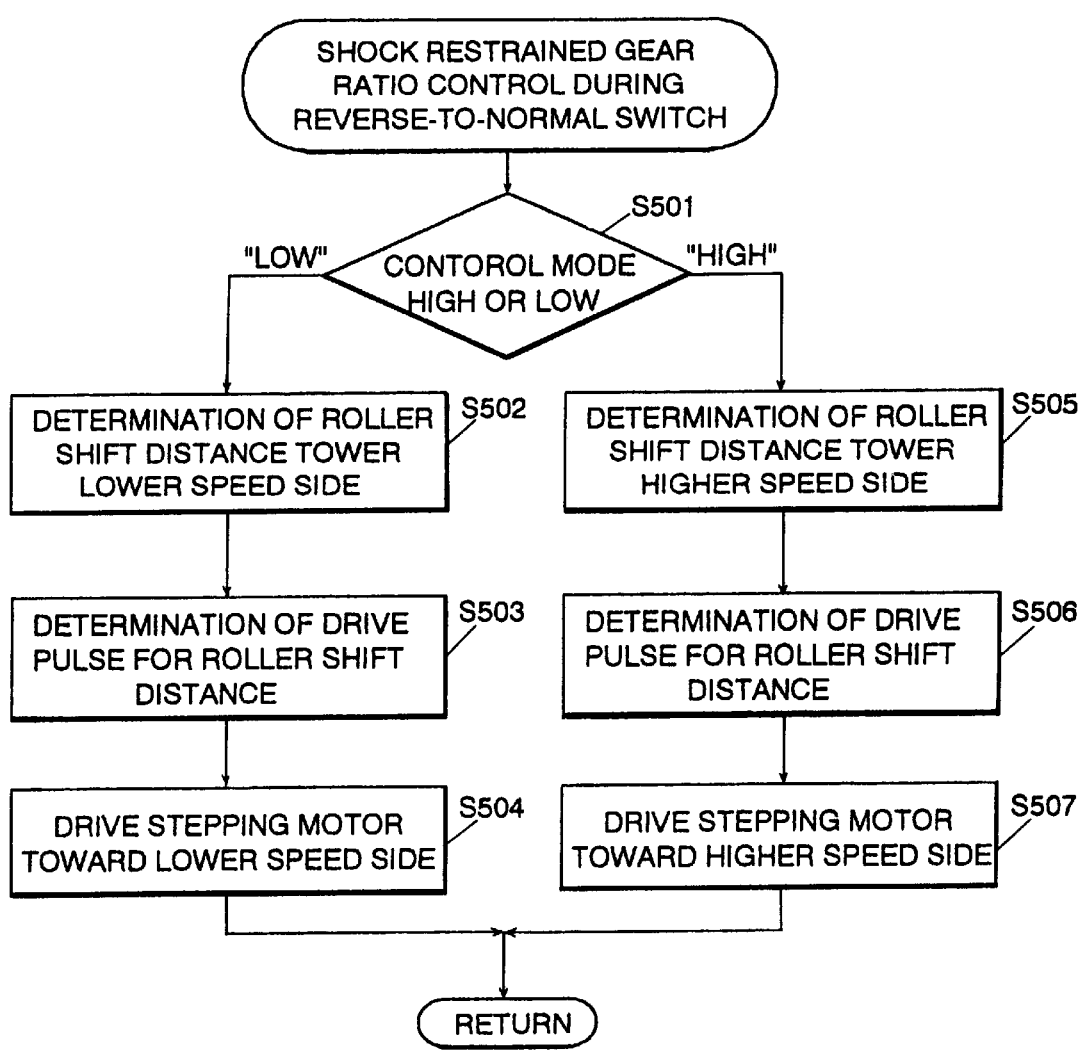
FIG. 22 is a flow chart illustrating a sequence subroutine of reverse-to-normal drive state switching control.

FIG. 22 shows a flow chart illustrating a sequence subroutine of the shift shock restrained gear ratio control during a reverse-to-normal state switch for the microprocessor of the control unit 300.

When the low-to-high mode switchover control subroutine commences and control proceeds to a function block at step S501 where a judgement is made as to whether the toroidal continuously variable gear mechanism 30 is in the high mode or in the low mode. When the toroidal continuously variable gear mechanism 30 is in the low mode, a target shift distance of the roller 33 of the toroidal continuously variable gear mechanism 30 toward the lower speed side is determined based on the input torque and gear ratio at step S502. Subsequently, the number of drive pulses for the stepping motor 251 necessary to move the valve sleeve 222 of the forward shift valve 220 by a distance corresponding to the target shift distance D of the roller 33 is determined at step S503, and the stepping motor 251 is driven with the pulses to shift the roller 33 to the lower speed side at step S504.

On the other hand, when the toroidal continuously variable gear mechanism 30 is in the high mode, a target shift distance of the roller 33 of the toroidal continuously variable gear mechanism 30 toward the higher speed side is determined based on the input torque and gear ratio at step S505. Subsequently, the number of pulses for the stepping motor 251 necessary to cause the target shift distance D of the roller 33 is determined at step S506, and the stepping motor 251 is driven with the pulses to shift the roller 33 to the higher speed side at step S507.

That is, upon an occurrence of a switch to the normal drive state from the reverse drive state in the low mode, the toroidal continuously variable gear mechanism 30 turns the transfer of torque in direction to the reverse direction from the normal direction with a result of turning the shift distance D of the roller 33 to the minus side or the lower speed side from the plus side or the higher speed side, as indicated by the arrow Db in FIG. 15. On the other hand, upon an occurrence of a switch to the normal drive state from the reverse drive state in the high mode, the toroidal continuously variable gear mechanism 30 turns the transfer of torque in direction to the normal direction from the reverse direction with a result of turning the shift distance D of the roller 33 to the plus side or the higher speed side from the minus side or the lower speed side, as indicated by the arrow Da in FIG. 15. By virtue of the control, when it is detected that the accelerator pedal is stepped on for example, the stepping motor 251 is actuated to shift the roller 33 through operation of the shift valve 220 prior to inclination of the roller 33, preventing generation of shocks due to steep shift and inclination of the roller 33 resulting from directional reversal of the transfer of torque.

Figure 23:
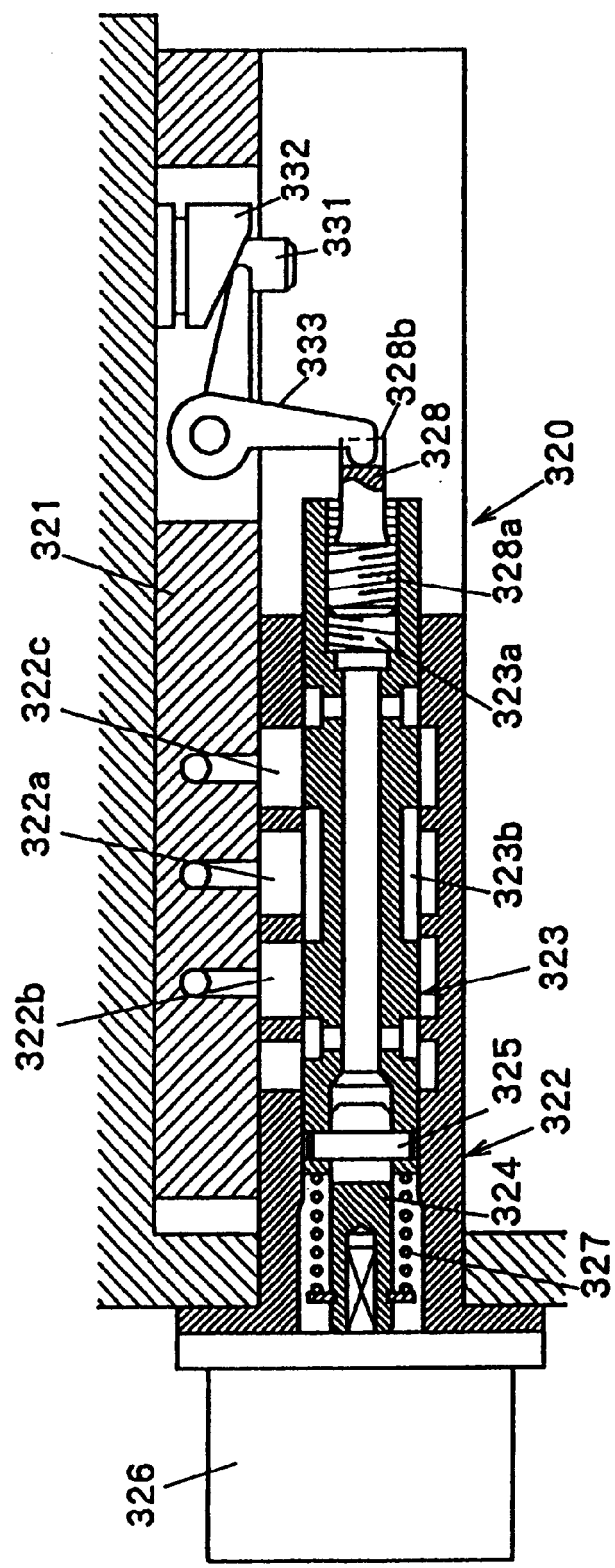
FIG. 23 is a cross-sectional view of another type of double-slider shift valve.

While, in the above embodiment, the double-slider shift valves 220 and 230 are employed as pressure control valves equipped with a feedback feature which are driven by the stepping motors 251 and 252 to control hydraulic pressure P$_H$ for speed increase and hydraulic pressure P$_L$ for speed reduction, another type of pressure control valve 320 such as shown in FIG. 23 may be incorporated.

Referring to FIG. 23, the valve 320 has a valve sleeve 322 secured to a valve body 321 and a valve spool 323 received to rotate in the valve sleeve 322. The valve spool 323 at one of its opposite ends is connected to an output shaft of a stepping motor 326 by means of a connecting rod 324 and a connecting pin 325 and forced toward the opposite end by a spring 327. The valve spool 323 at another end is formed with internal threads 323a which are engaged by a rod 328 formed with external threads 328a and an end slot 328b. A rod 331 integral with the trunnion (not shown) is provided with a cam 332. There is a crank lever 333 pivoted on the valve body 331, one arm of the crank lever 333 being in engagement with the cam 332 and another arm of the crank lever 333 being received in the end slot 328b of the rod 328. By means of the crank lever 333, rotation of the cam 332 is translated into axial movement of the valve spool 323. On the other hand, the valve spool 323 is rotated and axially moved by the stepping motor 326. During rotation of the valve spool 323, the rod 328 is prevented from rotation by means of the engagement with the crank lever 333. The valve sleeve 322 is formed with an inlet port 322a, and a speed increase pressure port 322b and a speed reduction pressure port 322c disposed on opposite sides of the inlet port 322a. The valve spool 323 is formed with an external groove 323b which brings the inlet port 322a into communication with the speed increase and speed reduction pressure ports 322b and 322c according relative positions between the valve sleeve 322 and the valve spool 323.

When the stepping motor 326 is driven to cause predetermined turns of the valve spool 323 in a normal direction, the valve spool 323 axially shifts from the balanced or neutral position shown in FIG. 23 to bring the inlet port 322a into communication with the speed increase pressure port 322b or the speed reduction pressure port 322c. Communication of the inlet port 322a with the speed increase pressure port 322b causes a rise in hydraulic pressure $P_H$ for speed increase with the result of inclining the roller 33 toward the higher speed side. The inclination of the roller 33 reactively turns the rod 332 and hence the cam 332, which is accompanied by a turn of the crank lever 333. As a result, the valve spool 323 is returned to the balanced or neutral position and the inlet port 322a is brought out of communication with the speed increase pressure port 322b or the speed reduction pressure port 322c. In this manner, the angle of inclination of the roller 33, i.e. the controlled gear ratio of the toroidal continuously variable gear mechanism 20, 30 is maintained.

As described above, according to the control system for the continuously variable transmission incorporating a toroidal continuously variable gear mechanism of the invention which causes an estimated shift of the roller of the toroidal continuously variable gear mechanism in an estimated direction prior to directional reversal of a shift of the roller from the neutral position due to directional reversal of the transfer of torque through the toroidal continuously variable gear mechanism when there is an occurrence of a switch of gear ratio control modes or an occurrence of a switch of vehicle drive states, generation of shocks due to steep shift and inclination of the roller 33 resulting from directional reversal of the transfer of torque is prevented or significantly restrained, which is always desirable for operational quality and performance of the continuously variable transmission.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for a toroidal continuously variable transmission which incorporates a toroidal continuously variable gear mechanism comprising an input toroidal disk, an output toroidal disk, a roller disposed between said input toroidal disk and said output toroidal disk and a support member for supporting said roller for rotation, and a hydraulically operated roller actuator for shifting and inclining said roller relative to said input and output toroidal disks from a neutral position through said support member according to hydraulic pressure levels to continuously vary a gear ratio between an input speed to said input toroidal disk from a driving power source and an output speed to a driven element from said output toroidal disk, said continuously variable transmission control system comprising:

driving condition detecting means for detecting driving conditions of said driving power source;

a shift valve for controlling hydraulic pressure levels supplied to said roller actuator according to vehicle running conditions and stopping supply of said hydraulic pressure to said roller actuator by a feedback of said inclination of said roller thereto to return said roller back to said neutral position; and control means for controlling said shift valve to control said hydraulic pressure levels such that, when said driving condition detecting means detects a specific driving condition of said driving power source which causes directional reversal of torque transmission through said continuously variable gear mechanism with a result of a shift of said roller from one side to another side of said neutral position, said roller actuator causes said shift of said roller in advance.

2. The continuously variable transmission control system as defined in claim 1, wherein said continuously variable transmission is disposed between an engine as said driving power source and drive wheels of a vehicle as said driven element, said driving condition detecting means detects a rotational speed of said engine as said driving condition, and said control means controls said shift valve to provide hydraulic pressure with which said roller actuator shifts and inclines said roller so that said continuously variable gear mechanism varies a gear ratio to bring said rotational speed of said engine to a target speed.

3. The continuously variable transmission control system as defined in claim 1, wherein said shift valve comprises a valve body, a hollow valve sleeve received to slide axially in said valve body and a valve spool received to slide axially in said hollow valve sleeve, said hollow valve sleeve being shifted relative to said valve spool to supply and control hydraulic pressure to said roller actuator to cause a shift of said roller according to a shifted position of said hollow valve sleeve and said valve spool being shifted by means of said shift of said roller to stop supply of said hydraulic pressure to said roller actuator.

4. A control system for a toroidal continuously variable transmission which incorporates a toroidal continuously variable gear mechanism comprising an input toroidal disk, an output toroidal disk, a roller disposed between said input toroidal disk and said output toroidal disk and a support member for supporting said roller for rotation, a hydraulically operated roller actuator for shifting and inclining said roller relative to said input and output toroidal disks from a neutral position through said support member according to hydraulic pressure levels to continuously vary a gear ratio between an input speed to said input toroidal disk from a driving power source and an output speed to a driven element from said output toroidal disk, and a planetary gear mechanism comprising a pinion carrier connected to an input member trough which driving power is transmitted to said toroidal continuously variable gear mechanism from said driving power source, a sun gear connected to said output toroidal disk and an internal gear connected to said driven element, said continuously variable transmission control system comprising:

driving condition detecting means for detecting driving conditions of said driving source;

a shift valve for controlling hydraulic pressure levels supplied to said roller actuator according to driving conditions and stopping supply of said hydraulic pressure to said roller actuator by a feedback of said inclination of said roller thereto to return said roller back to said neutral position;

mode switching means for switching gear ratio control of said continuously variable transmission between a first control mode in which driving power from said driving power source is transmitted to said driven element through a first power transmission path including both said toroidal continuously variable gear mechanism and said planetary gear mechanism and a second control mode in which driving power from said driving power source is transmitted to said driven element through a second power transmission path including said toroidal continuously variable gear mechanism; and control means for causing said mode switching means to switch said gear ratio control between said first and second control modes according to said driving conditions and controlling said shift valve to control said hydraulic pressure in level such that, when said driving condition detecting means detects a specific driving condition of said driving power source with which directional reversal of torque transmission through said continuously variable gear mechanism is caused with a result of a shift of said roller from one side to another side of said neutral position, said roller actuator causes said shift of said roller in advance.

5. The continuously variable transmission control system as defined in claim 4, wherein said control means determines whether the vehicle is in a normal drive state in which said engine drives said vehicle or in a reverse drive state in which said engine is driven by inertial running of said vehicle, determines whether said continuously variable transmission is switched from said first control mode to said second control mode or from said second control mode to said first control mode, controls said shift valve to control hydraulic pressure so as to cause a shift of said roller in a direction in which said toroidal continuously variable gear mechanism causes a change in gear ratio toward a higher speed side when there occurs directional reversal of torque transmission through said toroidal continuously variable gear mechanism due to a switch of said continuously variable transmission from said first control mode to said second control mode in said normal drive state and when there occurs directional reversal of torque transmission through said toroidal continuously variable gear mechanism due to a switch of said continuously variable transmission from said second control mode to said first control mode in said reverse drive state, and controls said shift valve to control hydraulic pressure so as to cause a shift of said roller in a direction in which said toroidal continuously variable gear mechanism causes a change in gear ratio toward a lower speed side when there occurs directional reversal of torque transmission through said toroidal continuously variable gear mechanism due to a switch of said continuously variable transmission from said second control mode to said first control mode in said normal drive state and when there occurs directional reversal of torque transmission through said toroidal continuously variable gear mechanism due to a switch of said continuously variable transmission from said first control mode to said second control mode in said reverse drive state.

6. The continuously variable transmission control system as defined in claim 5, wherein said control means controls said shift valve to provide hydraulic pressure based on input torque to said toroidal continuously variable gear mechanism at a point of time that said directional reversal of torque transmission occurs.

7. The continuously variable transmission control system as defined in claim 6, wherein said control means controls said shift valve to provide hydraulic pressure which becomes greater as said input torque to said toroidal continuously variable gear mechanism rises.

8. The continuously variable transmission control system as defined in claim 4, wherein said continuously variable transmission is disposed between an engine as said driving power source and drive wheels as said driven element of a vehicle, and said driving condition detecting means detects a rotational speed of said engine as said driving conditions.

9. The continuously variable transmission control system as defined in claim 8, wherein said control means controls said shift valve to provide hydraulic pressure based on input torque to said toroidal continuously variable gear mechanism at a point of time that said directional reversal of torque transmission occurs.

10. The continuously variable transmission control system as defined in claim 9, wherein said control means controls said shift valve to provide hydraulic pressure which becomes greater as said input torque to said toroidal continuously variable gear mechanism rises.

11. The continuously variable transmission control system as defined in claim 5, wherein said control means further determines whether said toroidal continuously variable gear mechanism is in said first control mode or in said second control mode, determines whether there occurs a switch from said normal drive state to said reverse drive state or a switch from said reverse drive state to said normal drive state, controls said shift valve to control hydraulic pressure so as to cause a shift of said roller in a direction in which said toroidal continuously variable gear mechanism causes a change in gear ratio toward a higher speed side when there occurs a switch from said normal drive state to said reverse drive mode ill said first control mode and when there occurs a switch from said reverse drive state to said normal drive state in said second control mode, and controls said shift valve to control hydraulic pressure so as to cause a shift of said roller in a direction in which said toroidal continuously variable gear mechanism causes a change in gear ratio toward a lower speed side when there occurs a switch from said reverse drive state to said normal drive mode in said first control mode and when there occurs a switch from said normal drive state to said reverse drive state in said second control mode.

12. The continuously variable transmission control system as defined in claim 11, wherein said control means controls said shift valve to provide hydraulic pressure based on input torque to said toroidal continuously variable gear mechanism at a point of time that said directional reversal of torque transmission occurs.

13. The continuously variable transmission control system as defined in claim 12, wherein said control means controls said shift valve to provide hydraulic pressure which becomes greater as said input torque to said toroidal continuously variable gear mechanism rises.

14. The continuously variable transmission control system as defined in claim 5, wherein said control means controls said shift valve to provide hydraulic pressure with which said roller actuator shifts and inclines said roller so that said continuously variable gear mechanism varies a gear ratio to bring said rotational speed of said engine to a target speed.

15. The continuously variable transmission control system as defined in claim 5, wherein said shift valve comprises a valve body, a hollow valve sleeve received to slide axially in said valve body and a valve spool received to slide axially in said hollow valve sleeve, said hollow valve sleeve being shifted relative to said valve spool to supply and control hydraulic pressure to said roller actuator to cause a shift of said roller according to a shifted position of said hollow valve sleeve and said valve spool being shifted by means of said shift of said roller to stop supply of said hydraulic pressure to said roller actuator.

16. A control system for a toroidal continuously variable transmission which incorporates a toroidal continuously variable gear mechanism comprising an input toroidal disk, an output toroidal disk, a roller disposed between said input toroidal disk and said output toroidal disk, a support member for supporting said roller for rotation, a hydraulically operated roller actuator for shifting and inclining said roller relative to said input and output toroidal disks from a neutral position through said support member according to hydraulic pressure levels to continuously vary a gear ratio between an input speed from a driving power source to said input toroidal disk and an output speed to a driven element from said output toroidal disk, and a planetary gear mechanism comprising a pinion carrier connected to an input member through which driving power is transmitted to said toroidal continuously variable gear mechanism from said driving-power source, a sun gear connected to said output toroidal disk and an internal gear connected to said driven element, said continuously variable control system comprising:

driving condition detecting means for detecting driving conditions of said driving source;

first friction coupling means for bringing said continuously variable transmission into a first control mode in which driving power from said driving power source is transmitted to said driven element through a first power transmission path including both said toroidal continuously variable gear mechanism and said planetary gear mechanism when locked;

second friction coupling means for bringing said continuously variable transmission into a second control mode in which driving power from said driving power source is transmitted to said driven element through a second power transmission path including said toroidal continuously variable gear mechanism but omitting said planetary gear mechanism when locked;

a shift valve for controlling hydraulic pressure levels supplied to said roller actuator according to said driving conditions and stopping supply of said hydraulic pressure to said roller actuator by a feedback of said inclination of said roller thereto to return said roller back to said neutral position;

mode switching means for alternitely locking and unlocking said first and second friction coupling means to switch said continuously variable transmission between said first and second control modes and locking both said first and second friction coupling means while said continuously variable transmission is being switched between said first and second control modes; and control means for causing said mode switching means to switch said continuously variable transmission between said first and second control modes according to said driving conditions and controlling said shift valve to control said hydraulic pressure such that, when said driving condition detecting means detects a specific driving condition of said driving power source with which a switch of said continuously variable transmission between said first and second control modes and directional reversal of torque transmission through is caused said continuously variable gear mechanism occurs with a result of a shift of said roller from one side to another side of said neutral position, said roller actuator causes said shift of said roller in advance while said first and second friction coupling means remain locked.

17. The continuously variable transmission control system as defined in claim 16, wherein said continuously variable transmission is disposed between an engine as said driving power source and drive wheels as said driven element of a vehicle, and said driving condition detecting means detects a rotational speed of said engine as said driving condition.

18. The continuously variable transmission control system as defined in claim 17, wherein said control means controls said shift valve to provide hydraulic pressure with which said roller actuator shifts and inclines said roller so that said continuously variable gear mechanism varies a gear ratio to bring s aid rotational speed of said engine to a target speed.

19. The continuously variable transmission control system as defined in claim 17, wherein said control means determines whether the vehicle is in a normal drive state in which said engine drives said vehicle or in a reverse drive state in which said engine is driven by inertial running of said vehicle, determines whether said continuously variable transmission is switched from said first control mode to said second control mode or from said second control mode to said first control mode, controls said shift valve to control hydraulic pressure so as to cause a shift of said roller in a direction in which said toroidal continuously variable gear mechanism causes a change in gear ratio toward a higher speed side when there occurs directional reversal of torque transmission through said toroidal continuously variable gear mechanism due to a switch of said continuously variable transmission from said first control mode to said second control mode in said normal drive state and when there occurs directional reversal of torque transmission through said toroidal continuously variable gear mechanism due to a switch of said continuously variable transmission from said second control mode to said first control mode in said reverse drive state, and controls said shift valve to control hydraulic pressure so as to cause a shift of said roller in a direction in which said toroidal continuously variable gear mechanism causes a change in gear ratio toward a lower speed side when there occurs directional reversal of torque transmission through said toroidal continuously variable gear mechanism due to a switch of said continuously variable transmission from said second control mode to said first control mode in said normal drive state and when there occurs directional reversal of torque transmission through said toroidal continuously variable gear mechanism due to a switch of said continuously variable transmission from said first control mode to said second control mode in said reverse drive state.

20. The continuously variable transmission control system as defined in claim 19, wherein said control means controls said shift valve to provide hydraulic pressure based on input torque to said toroidal continuously variable gear mechanism at a point of time that said directional reversal of torque transmission occurs.

21. The continuously variable transmission control system as defined in claim 20, wherein said control means controls said shift valve to provide hydraulic pressure which becomes greater as said input torque to said toroidal continuously variable gear mechanism rises.

22. The continuously variable transmission control system as defined in claim 17, wherein said control means controls said shift valve to provide hydraulic pressure based on input torque to said toroidal continuously variable gear mechanism at a point of time that said directional reversal of torque transmission occurs.

23. The continuously variable transmission control system as defined in claim 22, wherein said control means controls said shift valve to provide hydraulic pressure which becomes greater as said input torque to said toroidal continuously variable gear mechanism rises.

24. The continuously variable transmission control system as defined in claim 17, wherein said shift valve comprises a valve body, a hollow valve sleeve received to slide axially in said valve body and a valve spool received to slide axially in said hollow valve sleeve, said hollow valve sleeve being shifted relative to said valve spool to supply and control hydraulic pressure to said roller actuator to cause a shift of said roller according to a shifted position of said hollow valve sleeve and said valve spool being shifted by means of said shift of said roller to stop supply of said hydraulic pressure to said roller actuator.

25. A control system for a toroidal continuously variable transmission which incorporates a toroidal continuously variable gear mechanism comprising an input toroidal disk, an output toroidal disk, a roller disposed between said input toroidal disk and said output toroidal disk and a support member for supporting said roller for rotation, a hydraulically operated roller actuator for shifting and inclining said roller relative to said input and output toroidal disks from a neutral position through said support member according to hydraulic pressure levels to continuously vary a gear ratio between an input speed to said input toroidal disk from an engine and an output speed to drive wheels from said output toroidal disk, and a planetary gear mechanism comprising a pinion carrier connected to an input member through which driving power is transmitted to said toroidal continuously variable gear mechanism from said engine, a sun gear connected to said output toroidal disk and an internal gear connected to said drive wheels, said continuously variable transmission control system comprising:

- a speed sensor for detecting a rotational speed of said engine;
- a first clutch for bringing said continuously variable transmission into a first control mode in which driving power from said driving power source is transmitted to said driven element through a first power transmission path including both said toroidal continuously variable gear mechanism and said planetary gear mechanism when locked;
- a second clutch for bringing said continuously variable transmission into a second control mode in which driving power from said driving power source is transmitted to said driven element through a second power transmission path including said toroidal continuously variable gear mechanism but omitting said planetary gear mechanism when locked;
- a hydraulically operated mode switching actuator for alternately locking and unlocking said first and second clutches to switch said continuously variable transmission between said first and second control modes;
- a shift valve for controlling hydraulic pressure levels supplied to said roller actuator according to said driving conditions and stopping supply of said hydraulic pressure to said roller actuator by a feedback of said inclination of said roller thereto to return said roller back to said neutral position; and
- a controller for causing said mode switching actuator to switch said continuously variable transmission between said first and second control modes according to said driving conditions and controlling said shift valve to control said hydraulic pressure such that, when said speed sensor detects a specific speed of rotation of said engine at which a switch of said continuously variable transmission between said first and second control modes is caused and directional reversal of torque transmission through said continuously variable gear mechanism occurs with a result of a shift of said roller from one side to another side of said neutral position, said roller actuator causes said shift of said roller in advance.

26. The continuously variable transmission control system as defined in claim 25, wherein said controller further determines whether the vehicle is in a normal drive state in which said engine drives said vehicle or in a reverse drive state in which said engine is driven by inertial running of said vehicle, determines whether said continuously variable transmission is switched from said first control mode to said second control mode or from said second control mode to said first control mode, controls said shift valve to control hydraulic pressure so as to cause a shift of said roller in a direction in which said toroidal continuously variable gear mechanism causes a change in gear ratio toward a higher speed side when there occurs directional reversal of torque transmission through said toroidal continuously variable gear mechanism due to a switch of said continuously variable transmission from said first control mode to said second control mode in said normal drive state and when there occurs directional reversal of torque transmission through said toroidal continuously variable gear mechanism due to a switch of said continuously variable transmission from said second control mode to said first control mode in said reverse drive state, and controls said shift valve to control hydraulic pressure so as to cause a shift of said roller in a direction in which said toroidal continuously variable gear mechanism causes a change in gear ratio toward a lower speed side when there occurs directional reversal of torque transmission through said toroidal continuously variable gear mechanism due to a switch of said continuously variable transmission from said second control mode to said first control mode in said normal drive state and when there occurs directional reversal of torque transmission through said toroidal continuously variable gear mechanism due to a switch of said continuously variable transmission from said first control mode to said second control mode in said reverse drive state.

27. The continuously variable transmission control system as defined in claim 25, wherein said controller further determines whether said continuously variable transmission is in said first control mode or in said second control mode, determines whether there occurs a switch from said normal drive state to said reverse drive state or a switch from said reverse drive state to said normal drive state, controls said shift valve to control hydraulic pressure so as to cause a shift of said roller in a direction in which said toroidal continuously variable gear mechanism causes a change in gear ratio toward a higher speed side when there occurs a switch from said normal drive state to said reverse drive mode in said first control mode and when there occurs a switch from said reverse drive state to said normal drive state in said second control mode, and controls said shift valve to control hydraulic pressure so as to cause a shift of said roller in a direction in which said toroidal continuously variable gear mechanism causes a change in gear ratio toward a lower speed side when there occurs a switch from said reverse drive state to said normal drive mode in said first control mode and when there occurs a switch from said normal drive state to said reverse drive state in said second control mode.

28. A control system for a toroidal continuously variable transmission which incorporates a toroidal continuously variable gear mechanism comprising an input toroidal disk, an output toroidal disk, a roller disposed between said input toroidal disk and said output toroidal disk and a support member for supporting said roller for rotation, a hydraulically operated roller actuator for shifting and inclining said roller relative to said input and output toroidal disks from a neutral position through said support member according to hydraulic pressure levels to continuously vary a gear ratio between an input speed to said input toroidal disk from an engine and an output speed to drive wheels of a vehicle from said output toroidal disk, and a planetary gear mechanism comprising a pinion carrier connected to an input member through which driving power is transmitted to said toroidal continuously variable gear mechanism from said engine, a sun gear connected to said output toroidal disk and an internal gear connected to said drive wheels, said continuously variable transmission control system comprising:

a speed sensor for detecting a rotational speed of said engine;

a first clutch for creating in said continuously variable transmission a first control mode in which driving power from said engine is transmitted to said drive wheels through a first power transmission path including both said toroidal continuously variable gear mechanism and said planetary gear mechanism when locked;

a second clutch for creating in said continuously variable transmission a second control mode in which driving power from said engine is transmitted to said drive wheels through a second power transmission path including said toroidal continuously variable gear mechanism but omitting said planetary gear mechanism when locked;

a hydraulically operated mode switching actuator for alternately locking and unlocking said first and second clutches to switch said continuously variable transmission between said first and second control modes;

a shift valve for controlling hydraulic pressure levels supplied to said roller actuator according to said driving conditions and stopping supply of said hydraulic pressure to said roller actuator by a feedback of said inclination of said roller thereto to return said roller back to said neutral position; and a controller for causing said mode switching actuator to switch said continuously variable transmission between said first and second control modes according to said driving conditions and controlling said shift valve to control said hydraulic pressure such that, when said speed sensor detects a specific speed of rotation of said engine at which a switch of said continuously variable transmission between said first and second control modes is caused and directional reversal of torque transmission through said continuously variable gear mechanism occurs with a result of causing a shift of said roller from one side to another side of said neutral position, said roller actuator causes said shift of said roller in advance while said first and second clutches remain locked.

29. The continuously variable transmission control system as defined in claim 28, wherein said controller further determines whether the vehicle is in a normal drive state in which said engine drives said vehicle or in a reverse drive state in which said engine is driven by inertial running of said vehicle, determines whether said continuously variable transmission is switched from said first control mode to said second control mode or from said second control mode to said first control mode, controls said shift valve to control hydraulic pressure so as to cause a shift of said roller in a direction in which said toroidal continuously variable gear mechanism causes a change in gear ratio toward a higher speed side when there occurs directional reversal of torque transmission through said toroidal continuously variable gear mechanism due to a switch of said continuously variable transmission from said first control mode to said second control mode in said normal drive state and when there occurs directional reversal of torque transmission through said toroidal continuously variable gear mechanism due to a switch of said continuously variable transmission from said second control mode to said first control mode in said reverse drive state, and controls said shift valve to control hydraulic pressure so as to cause a shift of said roller in a direction in which said toroidal continuously variable gear mechanism causes a change in gear ratio toward a lower speed side when there occurs directional reversal of torque transmission through said toroidal continuously variable gear mechanism due to a switch of said continuously variable transmission from said second control mode to said first control mode in said normal drive state and when there occurs directional reversal of torque transmission through said toroidal continuously variable gear mechanism due to a switch of said continuously variable transmission from said first control mode to said second control mode in said reverse drive state, based on input torque to said toroidal continuously variable gear mechanism at a point of time that said directional reversal of torque transmission occurs.

\* \* \* \* \*